United States Patent
Zhu et al.

(10) Patent No.: US 12,120,348 B2
(45) Date of Patent: Oct. 15, 2024

(54) TRANSFORMER-BASED ARCHITECTURE FOR TRANSFORM CODING OF MEDIA

(71) Applicant: QUALCOMM Incorporated, San Diego, CA (US)

(72) Inventors: Yinhao Zhu, La Jolla, CA (US); Yang Yang, San Diego, CA (US); Taco Sebastiaan Cohen, Amsterdam (NL)

(73) Assignee: QUALCOMM INCORPORATED, San Diego, CA (US)

( * ) Notice: Subject to any disclaimer, the term of this patent is extended or adjusted under 35 U.S.C. 154(b) by 226 days.

(21) Appl. No.: 17/486,732

(22) Filed: Sep. 27, 2021

(65) Prior Publication Data

US 2023/0100413 A1 Mar. 30, 2023

(51) Int. Cl.
*G06T 9/00* (2006.01)
*G06N 3/0455* (2023.01)
(Continued)

(52) U.S. Cl.
CPC ........... *H04N 19/60* (2014.11); *G06N 3/0455* (2023.01); *G06T 7/11* (2017.01); *G06T 9/002* (2013.01);
(Continued)

(58) Field of Classification Search
CPC ...... G06N 3/0455; G06N 3/045; G06N 3/048; G06N 3/02; G06N 3/047; G06T 2207/20081; G06T 9/001; G06T 9/002; G06T 9/007; G06T 9/40; G06T 9/00; G06T 2207/10016; G06T 3/40; G06T 2207/20221; G06T 2207/20021; G06T 2207/20016; G06T 7/194; G06T 7/12; G06T 7/10; G06T 9/20; G06T 11/003; G06T 2210/12; G06T 7/248; G06T 7/207; G06T 7/168; G06T 7/223; G06T 2207/20084; G06T 5/00; G06T 5/60;
(Continued)

(56) References Cited

PUBLICATIONS

Yuan et al., TransAnomaly: Video Anomaly Detection Using Video Vision Transformer, Sep. 14, 2021 (1st instance: Aug. 30, 2021) [retrieved Jul. 26, 20230, IEEE Access, vol. 9,], pp. 123977-123986. Retrieved: https://ieeexplore.ieee.org/abstract/document/9525368 (Year: 2021).*

(Continued)

*Primary Examiner* — Matthew C Bella
*Assistant Examiner* — Dennis Rosario
(74) *Attorney, Agent, or Firm* — Polsinelli LLP

(57) ABSTRACT

Systems and techniques are described herein for processing media data using a neural network system. For instance, a process can include obtaining a latent representation of a frame of encoded image data and generating, by a plurality of decoder transformer layers of a decoder sub-network using the latent representation of the frame of encoded image data as input, a frame of decoded image data. At least one decoder transformer layer of the plurality of decoder transformer layers includes: one or more transformer blocks for generating one or more patches of features and determine self-attention locally within one or more window partitions and shifted window partitions applied over the one or more patches; and a patch un-merging engine for decreasing a respective size of each patch of the one or more patches.

41 Claims, 12 Drawing Sheets

(51) Int. Cl.

| | |
|---|---|
| *G06T 7/11* | (2017.01) |
| *G06V 10/26* | (2022.01) |
| *H04N 1/387* | (2006.01) |
| *H04N 9/877* | (2006.01) |
| *H04N 13/00* | (2018.01) |
| *H04N 19/543* | (2014.01) |
| *H04N 19/60* | (2014.01) |

(52) U.S. Cl.
CPC ............. *G06T 9/007* (2013.01); *G06V 10/26* (2022.01); *H04N 1/3876* (2013.01); *H04N 9/877* (2013.01); *H04N 19/543* (2014.11); *G06T 2207/20221* (2013.01); *H04N 2013/0088* (2013.01)

(58) Field of Classification Search
CPC ................ G06T 3/4046; G06T 3/4038; G06T 2207/20048; G06T 2207/20052; G06T 2207/20056; G06T 2207/20061; G06T 2207/20064; G06T 3/02; G06T 7/11; G06T 3/4084; H04N 19/597; H04N 19/70; H04N 13/161; H04N 19/176; H04N 19/20; H04N 19/46; H04N 19/96; H04N 19/52; H04N 19/129; H04N 19/132; H04N 19/172; H04N 19/23; H04N 19/30; H04N 19/61; H04N 19/88; H04N 19/109; H04N 19/12; H04N 19/137; H04N 19/40; H04N 19/44; H04N 19/463; H04N 19/91; H04N 19/97; H04N 21/2383; H04N 21/4382; H04N 7/0117; H04N 5/33; H04N 13/111; H04N 19/119; H04N 19/50; H04N 19/60; H04N 13/139; H04N 19/102; H04N 19/107; H04N 19/11; H04N 19/13; H04N 19/18; H04N 19/189; H04N 21/2353; H04N 1/3232; H04N 1/41; H04N 19/00; H04N 19/122; H04N 19/147; H04N 19/1883; H04N 19/27; H04N 19/53; H04N 19/63; H04N 19/649; H04N 19/85; H04N 2013/0092; H04N 21/26258; H04N 1/32144; H04N 19/103; H04N 19/115; H04N 19/14; H04N 19/154; H04N 19/169; H04N 19/187; H04N 19/21; H04N 19/36; H04N 19/39; H04N 19/48; H04N 19/57; H04N 2201/3238; H04N 19/17; H04N 19/174; H04N 21/4438; H04N 19/146; H04N 19/196; H04N 19/90; H04N 1/32154; H04N 19/167; H04N 19/625; H04N 19/89; H04N 19/645; H04N 19/59; H04N 2013/0088; H04N 11/143; H04N 11/162; H04N 11/165; H04N 11/183; H04N 11/186; H04N 13/361; H04N 19/157; H04N 1/3216; H04N 1/32165; H04N 1/32176; H04N 19/543; H04N 21/234; H04N 19/86; H04N 9/8045; H04N 9/8047; H04N 9/877; H04N 1/3876; H04N 19/563; H04N 21/4302; H04N 21/44004; H04N 19/517; H04N 21/4728; G06V 10/82; G06V 10/454; G06V 10/774; G06V 20/695; G06V 40/162; G06V 10/267; G06V 10/50; G06V 10/26; G06V 10/42; G06V 30/414; G06V 10/25; G06V 30/18057; G06V 40/161; G06V 10/7625; G06V 10/467; G06V 10/16; G06F 16/3329; G06F 40/56; G06F 17/147; G06F 40/151; G06F 40/00; G06F 18/213; G06F 18/2131; G06F 18/21345; G06F 18/21347; G06F 17/148; G06F 17/141; G06F 17/142; G06F 17/144; G06F 17/14; G06F 17/156; G06F 40/154; G06F 40/16; G06F 40/20; G06F 40/205; G10L 19/022; G10L 19/02; G10L 19/0216; G10L 19/0204; G10L 19/008; G10L 19/16; H03M 13/00

See application file for complete search history.

(56) References Cited

PUBLICATIONS

Li et al, Efficient Self-supervised Vision Transformers for Representation Learning, Jun. 17, 2021 [retrieved Jul. 26, 2023], Cornell University: arXiv, version: [v1], 24 pages. Retrieved: https://arxiv.org/abs/2106.09785v1 (Year: 2021).*

Iwai et al., Fidelity-Controllable Extreme Image Compression with Generative Adversarial Networks, Jan. 10-15, 2021 [retrieved Jul. 26, 2023], 2020 25th International Conference on Pattern Recognition, pp. 8235-8242. Retrieved: https://ieeexplore.ieee.org/abstract/document/9412185 (Year: 2021).*

Yang et al., Longitudinal Image Registration with Temporal-Order and Subject-Specificity Discrimination, Oct. 4-8, 2020 [retrieved Jul. 26, 2023], Medical Image Computing and Computer Assisted Intervention-2020, vol. LNCS 12263, pp. 243-252. Retrieved: (Year: 2020) https://link.springer.com/chapter/10.1007/978-3-030-59716-0_24 (Year: 2020).*

Isola et al., Image-to-Image Translation with Conditional Adversarial Networks, Nov. 26, 2018 [retrieved Jul. 26, 2023], Cornell University:arXiv, version: [v3], 17 pages. Retrieved: https://arxiv.org/abs/1611.07004 (Year: 2018).*

Balle et al., Variational image compression with a scale hyperprior, May 1, 2018 [retrieved Jul. 26, 2023], Cornell University: arXiv, version: [v2], 23 pages. Retrieved: https://arxiv.org/abs/1802.01436 (Year: 2018).*

Li et al., Full-Reference and No-Reference Quality Assessment for Compressed User-Generated Content Videos, Jun. 21, 2021 [retrieved Feb. 2, 2024], 2021 IEEE International Conference on Multimedia & Expo Workshops (ICMEW), pp. 1-6. Retrieved: https://ieeexplore.ieee.org/abstract/document/9456013 (Year: 2021).*

Arnab et al., ViViT: A Video Vision Transformer, Mar. 29, 2021 [retrieved Feb. 2, 2024], Cornell University: arXiv, version: [v1], 13 pages. Retrieved: https://arxiv.org/abs/2103.15691v1 (Year: 2021).*

Hendrycks et al., Gaussian Error Linear Units (GELUs), Jul. 8, 2020 [retrieved Feb. 2, 2024], Cornell University: arXiv, version: [v4], 1-9. Retrieved: https://arxiv.org/abs/1606.08415v4 (Year: 2020).*

Ye et al., AnoPCN: Video Anomaly Detection via Deep Predictive Coding Network, Oct. 15, 2019 [retrieved Feb. 2, 2024], MM '19: Proceedings of the 27th ACM International Conference on Multimedia, pp. 1805-1813. Retrieved: https://dl.acm.org/doi/abs/10.1145/3343031.3350899 (Year: 2019).*

Lee et al., An End-to-End Joint Learning Scheme of Image Compression and Quality Enhancement with Improved Entropy Minimization, Mar. 13, 2020 [retrieved May 24, 2024], Cornell University: arXiv, version [2], pp. 1-25. Retrieved: https://arxiv.org/abs/1912.12817 (Year: 2020).*

Shaw et al., Self-Attention with Relative Position Representations, Apr. 12, 2018 [retrieved May 24, 2024], Cornell University: arXiv, version [2], 5 pages. Retrieved: https://arxiv.org/abs/1803.02155 (Year: 2018).*

Cao H., et al., "Swin-Unet: Unet-like Pure Transformer for Medical Image Segmentation", arxiv.org, Cornell University Library, 201 Olin Library Cornell University Ithaca, NY 14853, May 12, 2021, XP081962410, abstract, figures 1,2, paragraph [0003], pp. 1-14.

International Search Report and Written Opinion—PCT/US2022/076496—ISA/EPO—Dec. 20, 2022.

Lin A., et al., "DS-TransUNet: Dual Swin Transformer U-Net for Medical Image Segmentation", arxiv. org, Cornell University Library,

(56) References Cited

PUBLICATIONS

201 Olin Library Cornell University Ithaca, NY 14853, Jun. 12, 2021 XP081988747, abstract, figures 1, 2 paragraphs [000I]-[0III], pp. 1-13.

Liu Z., et al., "Swin Transformer: Hierarchical Vision Transformer Using Shifted Windows", arxiv. org, Cornell University Library, 201 Olin Library Cornell University Ithaca, NY 14853, XP091024409, arXiv:2103.14030v2 [cs.CV], Aug. 17, 2021, 14 pages, abstract, figures 2,3 paragraphs [0001], [0003].

Minnen D., et al., "Channel-Wise Autoregressive Entropy Models for Learned Image Compression", arxiv.org, Cornell University Library, 201 Olin Library Cornell University Ithaca, NY 14853, Jul. 17, 2020, XP081722259, the whole document, 16 Pages.

Minnen D., et al., "Joint Autoregressive and Hierarchical Priors for Learned Image Compression", arxiv. org, Cornell University Library, 201 Olin Library Cornell University Ithaca, NY 14853, Sep. 8, 2018 (Sep. 8, 2018), XP081188741, 22 pages, abstract, figure 1, figures 17, 18, 19, 21, sections 1 and 2, section 4, paragraphs [0001], [0002] abstract.

Shi Z., et al., "Learning for Unconstrained Space-Time Video Super-Resolution", arxiv.org, Cornell University Library, 201 Olin Library Cornell University Ithaca, NY 14853, Feb. 25, 2021, XP081892562, pp. 1-12, paragraph [IV.A.2].

Zhu F., et al., "Semi-Supervised Wide-Angle Portraits Correction by Multi-Scale Transformer", arxiv.org, Cornell University Library, 201 Olin Library Cornell University Ithaca, NY 14853, Sep. 14, 2021, XP091057092, the whole document, 13 Pages.

Zhu Y., et al., "Transformer-Based Transform Coding", Sep. 29, 2021, XP093005391, the whole document, 35 Pages.

\* cited by examiner

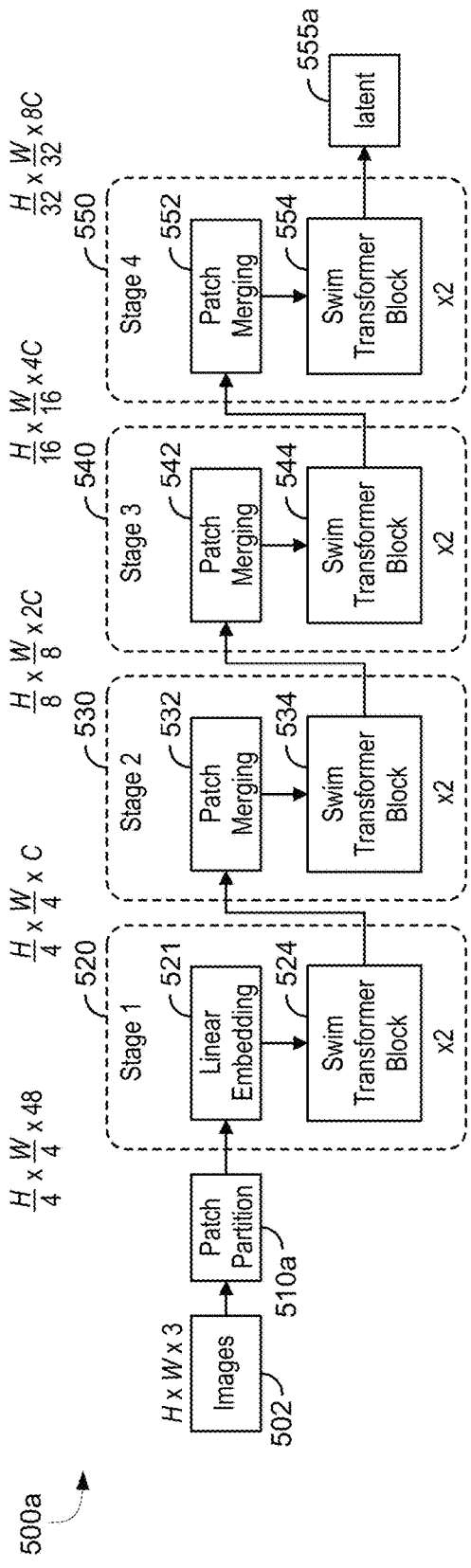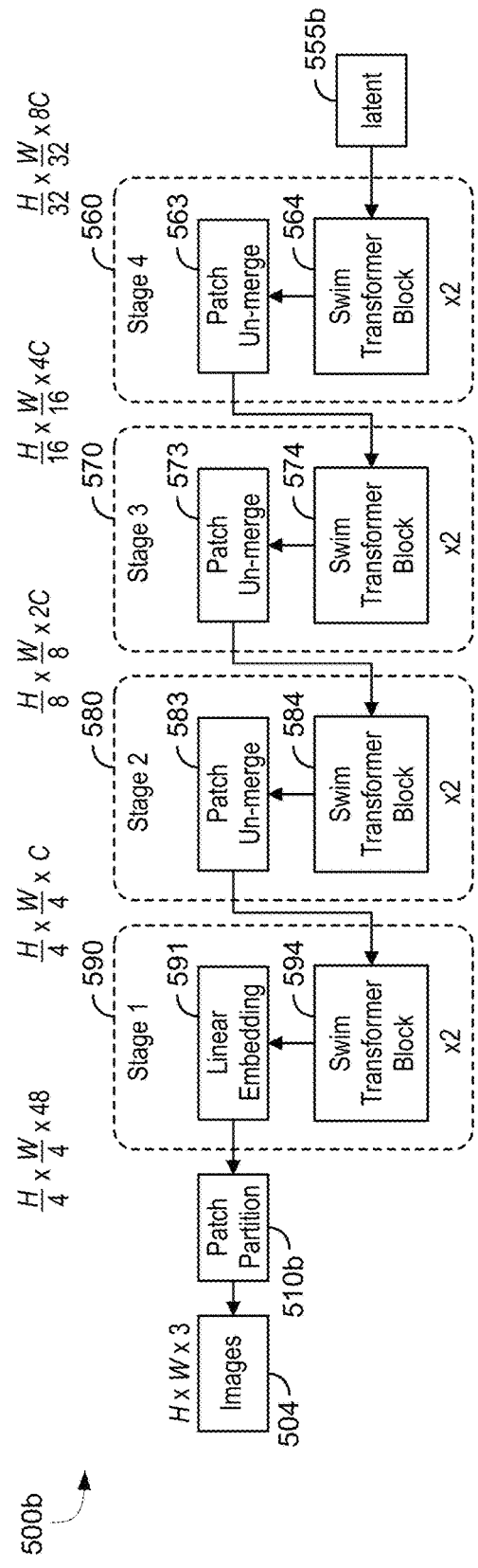

TRANSFORMER-BASED ARCHITECTURE FOR TRANSFORM CODING OF MEDIA

FIELD

The present disclosure generally relates to image and video coding, including encoding (or compression) and decoding (decompression) of images and/or video. For example, aspects of the present disclosure relate to techniques for performing transform coding and non-linear transforms using transformer layers with shifted self-attention windows.

BACKGROUND

Many devices and systems allow video data to be processed and output for consumption. Digital video data includes large amounts of data to meet the demands of consumers and video providers. For example, consumers of video data desire high quality video, including high fidelity, resolutions, frame rates, and the like. As a result, the large amount of video data that is required to meet these demands places a burden on communication networks and devices that process and store the video data.

Video coding techniques may be used to compress video data. A goal of video coding is to compress video data into a form that uses a lower bit rate, while avoiding or minimizing degradations to video quality. With ever-evolving video services becoming available, encoding techniques with better coding efficiency are needed.

SUMMARY

In some examples, systems and techniques are described for coding (e.g., encoding and/or decoding) media data using a transformer-based neural network architecture. According to at least one illustrative example, a method is provided for processing media data, including: obtaining a latent representation of a frame of encoded image data; and generating, by a plurality of decoder transformer layers of a decoder sub-network using the latent representation of the frame of encoded image data as input, a frame of decoded image data, wherein at least one decoder transformer layer of the plurality of decoder transformer layers includes: one or more transformer blocks for generating one or more patches of features and determine self-attention locally within one or more window partitions and shifted window partitions applied over the one or more patches; and a patch un-merging engine for decreasing a respective size of each patch of the one or more patches.

In another example, an apparatus for processing media data is provided that includes at least one memory (e.g., configured to store data, such as virtual content data, one or more images, etc.) and one or more processors (e.g., implemented in circuitry) coupled to the at least one memory. The one or more processors are configured to and can: obtain a latent representation of a frame of encoded image data; and generate, based on a plurality of decoder transformer layers of a decoder sub-network using the latent representation of the frame of encoded image data as input, a frame of decoded image data, wherein at least one decoder transformer layer of the plurality of decoder transformer layers includes: one or more transformer blocks configured to generate one or more patches of features and determine self-attention locally within one or more window partitions and shifted window partitions applied over the one or more patches; and a patch un-merging engine configured to decrease a respective size of each patch of the one or more patches.

In another example, a non-transitory computer-readable medium is provided that has stored thereon instructions that, when executed by one or more processors, cause the one or more processors to: obtain a latent representation of a frame of encoded image data; and generate, based on a plurality of decoder transformer layers of a decoder sub-network using the latent representation of the frame of encoded image data as input, a frame of decoded image data, wherein at least one decoder transformer layer of the plurality of decoder transformer layers includes: one or more transformer blocks configured to generate one or more patches of features and determine self-attention locally within one or more window partitions and shifted window partitions applied over the one or more patches; and a patch un-merging engine configured to decrease a respective size of each patch of the one or more patches.

An apparatus for processing media data is provided. The apparatus includes: means for obtaining a latent representation of a frame of encoded image data; and means for generating, based on a plurality of decoder transformer layers of a decoder sub-network using the latent representation of the frame of encoded image data as input, a frame of decoded image data, wherein at least one decoder transformer layer of the plurality of decoder transformer layers includes: one or more transformer blocks configured to generate one or more patches of features and determine self-attention locally within one or more window partitions and shifted window partitions applied over the one or more patches; and a patch un-merging engine configured to decrease a respective size of each patch of the one or more patches.

In some aspects, to generate the frame of decoded image data, the method, apparatuses, and computer-readable medium described above can include: determining, by a first transformer block of a first decoder transformer layer of the plurality of decoder transformer layers, self-attention locally within one or more first window partitions applied over the one or more patches; determining, by a second transformer block of the first decoder transformer layer, self-attention locally within one or more second window partitions applied over the one or more patches, wherein the one or more second window partitions are shifted to overlap one or more boundaries between adjacent ones of the one or more first window partitions; and segmenting, by the patch un-merging engine, each patch of the one or more patches into a plurality of un-merged patches, wherein the plurality of un-merged patches are non-overlapping.

In some aspects, the method, apparatuses, and computer-readable medium described above can include: providing the plurality of un-merged patches to a first transformer block of a second decoder transformer layer of the plurality of decoder transformer layers.

In some aspects, the method, apparatuses, and computer-readable medium described above can include: segmenting, by a patch un-merging engine of the second decoder transformer layer, the plurality of un-merged patches; and providing an output of the patch un-merging engine to a third decoder transformer layer of the plurality of decoder transformer layers.

In some aspects, each un-merged patch of the plurality of un-merged patches has a uniform patch size and the patch un-merging engine applies a patch size reduction factor of two.

In some aspects, to segment each patch of the one or more patches into the plurality of un-merged patches, the method, apparatuses, and computer-readable medium described above can include decreasing a feature dimension of the plurality of un-merged patches.

In some aspects, the method, apparatuses, and computer-readable medium described above can include: receiving, by the plurality of decoder transformer layers, the latent representation of the frame of encoded image data as input and apply a non-linear transform to generate a frame of decoded image data.

In some aspects, the non-linear transform is a synthesis transform and the frame of decoded image data is a reconstruction of an input image associated with the frame of encoded image data.

In some aspects, the method, apparatuses, and computer-readable medium described above can include: training one or more decoder transformer layers of the plurality of decoder transformer layers using a loss function based at least in part on rate-distortion. In some cases, the loss function includes a Lagrangian multiplier for rate distortion.

In some aspects, at least a portion of the one or more transformer blocks included in the at least one decoder transformer layer have a same architecture.

In some aspects, each of the one or more transformer blocks included in the at least one decoder transformer layer have a same architecture.

In some aspects, the frame of encoded image data includes an encoded still image.

In some aspects, the frame of encoded image data includes an encoded video frame.

In some aspects, the method, apparatuses, and computer-readable medium described above can include: training the plurality of decoder transformer layers with at least a first training data set and a second training data set, wherein data of the second training data set has a reversed temporal order as compared to data of the first training data set.

In some aspects, the plurality of decoder transformer layers include a series of consecutive decoder transformer layers.

According to another illustrative example, a method is provided for processing media data. The method includes: segmenting a frame into a plurality of patches; and generating, by a plurality of encoder transformer layers of an encoder sub-network using the plurality of patches as input, a frame of encoded image data.

In another example, an apparatus for processing media data is provided that includes at least one memory (e.g., configured to store data, such as virtual content data, one or more images, etc.) and one or more processors (e.g., implemented in circuitry) coupled to the at least one memory. The one or more processors are configured to and can: segment a frame into a plurality of patches; and generate, based on a plurality of encoder transformer layers of an encoder sub-network using the plurality of patches as input, a frame of encoded image data.

In another example, a non-transitory computer-readable medium is provided that has stored thereon instructions that, when executed by one or more processors, cause the one or more processors to: segment a frame into a plurality of patches; and generate, based on a plurality of encoder transformer layers of an encoder sub-network using the plurality of patches as input, a frame of encoded image data.

An apparatus for processing media data is provided. The apparatus includes: means for segmenting a frame into a plurality of patches; and means for generating, based on a plurality of encoder transformer layers of an encoder sub-network using the plurality of patches as input, a frame of encoded image data.

In some aspects, to generate the frame of encoded image data, the method, apparatuses, and computer-readable medium described above can include: determining, by a first transformer block of a first encoder transformer layer of the plurality of encoder transformer layers, self-attention locally within one or more window partitions; determining, by a second transformer block of the first encoder transformer layer, self-attention locally within one or more shifted window partitions, wherein the one or more shifted window partitions overlap the one or more window partitions; determining, by one or more of the first transformer block and the second transformer block, one or more patches of features for applying a non-linear transform to the segmented frame; and increasing, by a patch merging engine, a patch size between the first encoder transformer layer and a second encoder transformer layer.

In some aspects, the patch merging engine is configured to combine a plurality of adjacent patches from the first encoder transformer layer into a merged patched provided to the second encoder transformer layer.

In some aspects, an output of the second transformer block of the first encoder transformer layer is coupled to an input of the second encoder transformer layer.

In some aspects, the method, apparatuses, and computer-readable medium described above can include: generating, by the plurality of encoder transformer layers of the encoder sub-network using the plurality of patches as input, a hierarchical feature map for the segmented frame; and generating the frame of encoded image data from the hierarchical feature map.

In some aspects, each patch of the plurality of patches is of a uniform size and includes one or more pixels of the segmented frame.

In some aspects, the method, apparatuses, and computer-readable medium described above can include: increasing, using the patch merging engine, the patch size by concatenating features obtained from one or more subsets of adjacent patches, each subset of adjacent patches merged into a merged patch output by the patch merging engine.

In some aspects, the first transformer block and the second transformer block have a same architecture.

In some aspects, the method, apparatuses, and computer-readable medium described above can include: providing the plurality of patches to a linear embedding layer of the encoder sub-network prior to the first encoder transformer layer.

In some aspects, the frame of encoded image data is a latent representation of image data.

In some aspects, the latent representation is a hierarchical feature map generated by the plurality of encoder transformer layers of the encoder sub-network.

In some aspects, the method, apparatuses, and computer-readable medium described above can include: training one or more encoder transformer layers of the plurality of encoder transformer layers using a loss function based on a rate-distortion loss. In some cases, the loss function includes a Lagrangian multiplier for rate distortion.

In some aspects, the plurality of patches are segmented from an input comprising a still image frame or a video frame.

In some aspects, the method, apparatuses, and computer-readable medium described above can include: entropy coding the encoded image data with a factorized prior.

In some aspects, the apparatus comprises a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 5A is a diagram illustrating an example of a transformer-based neural network architecture for an encoder of a neural network-based image and video coding system, in accordance with some examples;

FIG. 5B is a diagram illustrating an example of a transformer-based neural network architecture for a decoder of a neural network-based image and video coding system, in accordance with some examples;

DETAILED DESCRIPTION

Figure 1:
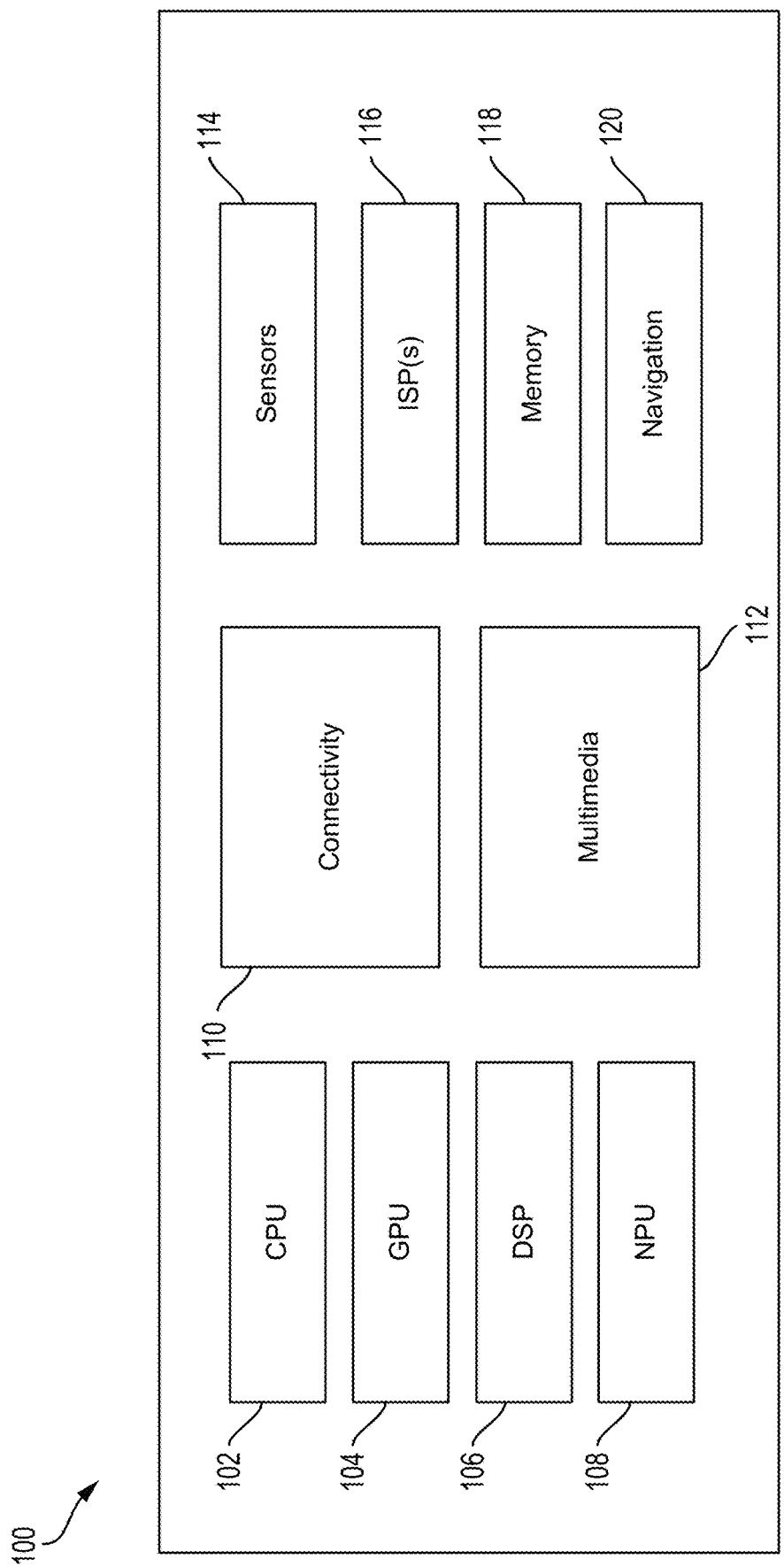
FIG. 1 illustrates an example implementation of a system-on-a-chip (SOC)

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Digital video data can include large amounts of data, particularly as the demand for high quality video data continues to grow. For example, consumers of video data typically desire video of increasingly high quality, with high fidelity, resolution, frame rate, and the like. However, the large amount of video data required to meet the high demand is often associated with large bandwidth and storage needs, placing a significant burden on communication networks as well as on devices that process and store the video data.

Various techniques can be used to code video data. For example, video coding can be performed according to a particular video coding standard. Example video coding standards include high-efficiency video coding (HEVC), advanced video coding (AVC), and versatile video coding (VVC) developed by moving picture experts group (MPEG), as well as AOMedia Video 1 (AV1) developed by the Alliance for Open Media (AOM). Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality, e.g., when the compressed video data is decompressed. As the demand for video services grows and new video services become available, coding techniques with better coding efficiency, performance, and rate control are needed.

Systems, apparatuses, processes (also referred to as methods), and computer-readable media (collectively referred to as "systems and techniques") are described herein for performing image and/or video coding using one or more machine learning (ML) systems. In general, ML can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in the neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

CNNs (and in some cases RNNs) are commonly used in the context of image-based inputs, such as to implement computer vision or perform image/video coding. For example, in the context of image/video coding, existing approaches make use of autoregressive CNNs to implement the prior model that is used to perform entropy encoding and decoding. Although some existing approaches have been seen to achieve a rate-distortion performance that is on-par with or surpasses that of traditional codecs, low latency (e.g., real-time or near real-time) coding cannot be achieved due to the complexity and latency of autoregressive decoding performed by autoregressive CNNs.

Systems and techniques are needed for accurately and more efficiently performing image and video coding with low latency. While ML and DL-based approaches have shown theoretical improvements over existing codecs in terms of rate-distortion performance, these existing approaches are often limited by their inability to run with low latency (e.g., based on the autoregressive decoding performed by autoregressive CNNs, as noted above). Moreover, as the resolution of image and video data continues to increase, the computational runtime of these existing approaches will likely only continue to increase.

In some aspects, the systems and techniques described herein include a transformer-based image and video coding system that can perform low latency image and/or video coding with faster coding (e.g., decoding) than other neural network based image and/or video coding systems, such as CNN based transforms. For instance, using the transformer-based transforms, the systems and techniques described herein can achieve a coding efficiency gain of at least 7% on the Kodak image compression dataset and 12% on the Ultra Video Group (UVG) video compression dataset (low delay mode).

A transformer is a type of deep learning model that utilizes an attention mechanism to differentially weight the significance of each part of the input data and model long-range dependencies. While transformers are often used to handle sequential input data, a transformer does not necessarily process the data in the same sequential order in which the data was originally received or arranged. Moreover, because transformers can use attention to determine contextual relationships between sub-portions of the input data, a transformer can process some or all of the sub-portions in parallel, such as when computing attention or self-attention. This parallelization can provide greater computational flexibility in comparison to, for example, RNNs, CNNs, or other neural networks trained to perform the same task.

In some cases, the transformer-based image and video coding system described herein includes an encoder sub-network and a decoder sub-network, each comprising multiple consecutive shifted window transformer layers. The encoder sub-network applies a transform to convert an input image into a latent representation, while the decoder sub-network applies a transform to convert the latent representation into a reconstructed image, which is a reconstructed version of the input image. Input images can include still images (e.g., photographs and other types of still images) and video images (e.g., frames of video). In some examples, the encoder and decoder sub-networks can apply non-linear transforms that, used in conjunction with a factorized prior (e.g., as opposed to the more computationally complex autoregressive priors used in CNN-based approaches), allows for low latency encoding and decoding of image data. Moreover, the transformer-based image and video coding system described herein can achieve this low latency encoding and decoding with a rate-distortion loss that matches or improves the rate-distortion loss associated with existing neural network image and video coding systems (e.g., CNN-based image and video coding systems).

In some examples, the decoder sub-network is symmetric to the encoder sub-network, with the exception of patch un-merging engines that replace and reverse the functionality of patch merging engines included in the encoder sub-network. The encoder and decoder sub-networks operate over a series of patches (also referred to herein as "patch tokens"). In some cases, the series of patches are initially formed at the encoder sub-network as anon-overlapping segmentation of an input image.

In some aspects, the encoder sub-network and the decoder sub-network utilize a modified self-attention computation with a shifted window approach. The shifted window approach is based on pairs of self-attention layers (also referred to as self-attention layer pairs) that limit self-attention computation to non-overlapping local windows while also allowing for cross-window connections. In some examples, cross-window connections can be utilized in deeper self-attention layers to determine attention vectors that each span (e.g., are based on elements from) multiple discrete attention windows of a lower self-attention layer. In an illustrative example, a first layer of a self-attention layer pair can apply a first partitioning configuration to divide a set of patches into non-overlapping windows that each contain multiple patches—self-attention is then computed locally within each window. In a second layer of the self-attention layer pair, the window partitioning is shifted, resulting in new windows that overlap the windows from the first self-attention layer. The self-attention computation in the shifted windows of the second self-attention layer crosses the boundaries of the previous windows in the first self-attention layer, thereby providing connections among them.

By limiting the self-attention computation to the non-overlapping local windows of the first self-attention layer, the transformer-based image and video coding system described herein can achieve greater efficiency and computational performance that supports low latency image and video encoding and decoding (and in some cases real-time or near real-time encoding and decoding, such as when fast entropy models are used). For example, in some aspects, the transformer-based image and video coding system has linear computational complexity relative to image size. By introducing cross-window connections determined by the shifted window partitioning of the second self-attention layer, the transformer-based image and video coding system described herein can achieve a rate-distortion loss that matches or improves upon the rate-distortion loss associated with CNN-based and other existing image and video coding approaches.

Various aspects of the present disclosure will be described with respect to the figures. FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform video compression and/or decompression (also referred to as video encoding and/or decoding, collectively referred to as video coding) using machine learning techniques according to aspects of the present disclosure discussed herein. By using deep learning architectures to perform video compression and/or decompression, aspects of the present disclosure can increase the efficiency of video compression and/or decompression on a device. For example, a device using the video coding techniques described can compress video more efficiently using the machine learning based techniques, can transmit the compressed video to another device, and the other device can decompress the compressed video more efficiently using the machine learning based techniques described herein.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
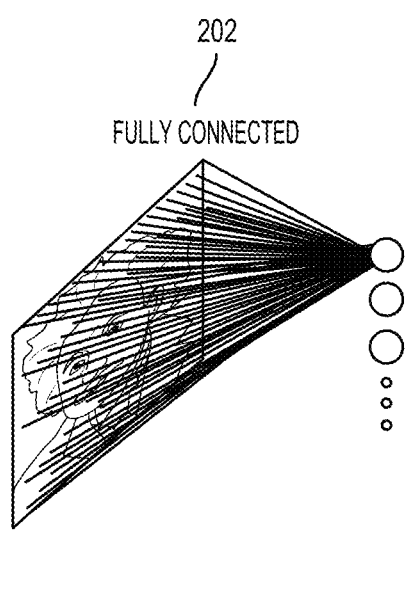
FIG. 2A illustrates an example of a fully connected neural network.
Figure 2B:
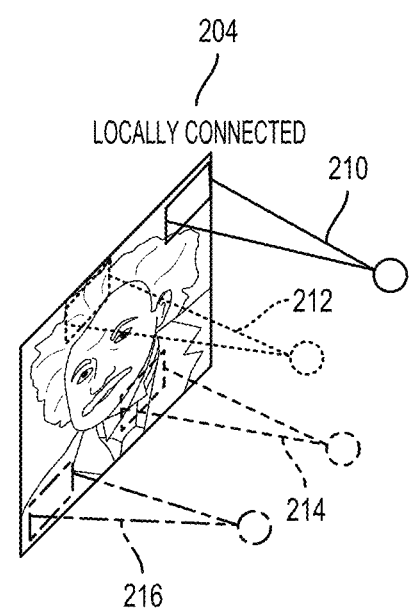
FIG. 2B illustrates an example of a locally connected neural network.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

As noted previously, digital video data can include large amounts of data, which can place a significant burden on communication networks as well as on devices that process and store the video data. For instance, recording uncompressed video content generally results in large file sizes that greatly increase as the resolution of the recorded video content increases. In one illustrative example, uncompressed 16-bit per channel video recorded in 1080p/24 (e.g., a resolution of 1920 pixels in width and 1080 pixels in height, with 24 frames per second captured) may occupy 12.4 megabytes per frame, or 297.6 megabytes per second. Uncompressed 16-bit per channel video recorded in 4K resolution at 24 frames per second may occupy 49.8 megabytes per frame, or 1195.2 megabytes per second.

Network bandwidth is another constraint for which large video files can become problematic. For example, video content is oftentimes delivered over wireless networks (e.g., via LTE, LTE-Advanced, New Radio (NR), WiFi™, Bluetooth™, or other wireless networks), and can make up a large portion of consumer internet traffic. Despite advances in the amount of available bandwidth in wireless networks, it may still be desirable to reduce the amount of bandwidth used to deliver video content in these networks.

Because uncompressed video content can result in large files that may involve sizable memory for physical storage and considerable bandwidth for transmission, video coding techniques can be utilized to compress and then decompress such video content.

To reduce the size of video content—and thus the amount of storage involved to store video content—and the amount of bandwidth involved in delivering video content, various video coding techniques can be performed according to a particular video coding Standard, such as HEVC, AVC, MPEG, VVC, among others. Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

In general, an encoding device encodes video data according to a video coding Standard to generate an encoded video bitstream. In some examples, an encoded video bitstream (or "video bitstream" or "bitstream") is a series of one or more coded video sequences. The encoding device can generate coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

According to the HEVC standard, transformations may be performed using TUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoding device.

Once the pictures of the video data are partitioned into CUs, the encoding device predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

After performing prediction using intra- and/or inter-prediction, the encoding device can perform transformation and quantization. For example, following prediction, the encoding device may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoding device can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoding device. A given CU having one or more PUs may also include one or more TUs. As described in further detail below, the residual values may be transformed into transform coefficients using the block transforms, and then may be quantized and scanned using TUs to produce serialized transform coefficients for entropy coding.

The encoding device may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoding device. In some examples, the encoding device may utilize a predefined scan order to scan the quantized transform coefficients to produce a serialized vector that can be entropy encoded. In some examples, encoding device may perform an adaptive scan. After scanning the quantized transform coefficients to form a vector (e.g., a one-dimensional vector), the encoding device may entropy encode the vector. For example, the encoding device may use context adaptive variable length coding, context adaptive binary arithmetic coding, syntax-based context-adaptive binary arithmetic coding, probability interval partitioning entropy coding, or another suitable entropy encoding technique.

The encoding device can store the encoded video bitstream and/or can send the encoded video bitstream data over a communications link to a receiving device, which can include a decoding device. The decoding device may decode the encoded video bitstream data by entropy decoding (e.g., using an entropy decoder) and extracting the elements of one or more coded video sequences making up the encoded video data. The decoding device may then rescale and perform an inverse transform on the encoded video bitstream data. Residual data is then passed to a prediction stage of the decoding device. The decoding device then predicts a block of pixels (e.g., a PU) using intra-prediction, inter-prediction, IBC, and/or other type of prediction. In some examples, the prediction is added to the output of the inverse transform (the residual data). The decoding device may output the decoded video to a video destination device, which may include a display or other output device for displaying the decoded video data to a consumer of the content.

Video coding systems and techniques defined by the various video coding Standards (e.g., the HEVC video coding techniques described above) may be able to retain much of the information in raw video content and may be defined a priori based on signal processing and information theory concepts. However, in some cases, a machine learning (ML)-based image and/or video system can provide benefits over non-ML based image and video coding systems, such as an end-to-end neural network-based image and video coding (E2E-NNVC) system. As described above, many E2E-NNVC systems are designed as combination of an autoencoder sub-network (the encoder sub-network) and a second sub-network responsible for learning a probabilistic model over quantized latents used for entropy coding. Such an architecture can be viewed as a combination of a transform plus quantization module (encoder sub-network) and the entropy modelling sub-network module.

Figure 3:
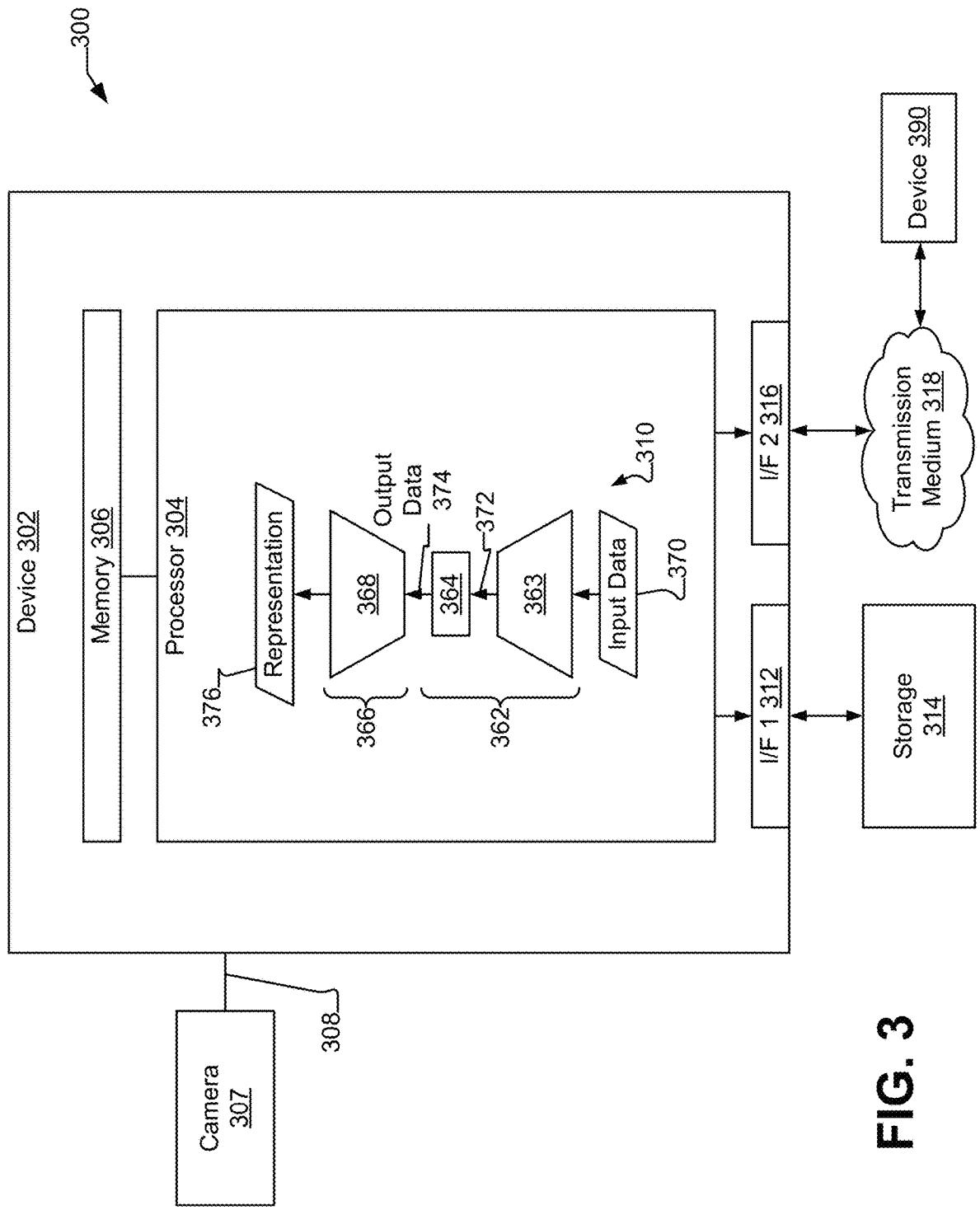
FIG. 3 is a diagram illustrating an example of a system including a device operable to perform image and/or video coding (encoding and decoding) using a neural network-based system, in accordance with some examples.

FIG. 3 depicts a system 300 that includes a device 302 configured to perform image and/or video encoding and decoding using an E2E-NNVC system 310. The device 302 is coupled to a camera 307 and a storage medium 314 (e.g., a data storage device). In some implementations, the camera 307 is configured to provide the image data 308 (e.g., a video data stream) to the processor 304 for encoding by the E2E-NNVC system 310. In some implementations, the device 302 can be coupled to and/or can include multiple cameras (e.g., a dual-camera system, three cameras, or other number of cameras). In some cases, the device 302 can be coupled to a microphone and/or other input device (e.g., a keyboard, a mouse, a touch input device such as a touch-screen and/or touchpad, and/or other input device). In some examples, the camera 307, the storage medium 314, microphone, and/or other input device can be part of the device 302.

The device 302 is also coupled to a second device 390 via a transmission medium 318, such as one or more wireless networks, one or more wired networks, or a combination thereof. For example, the transmission medium 318 can include a channel provided by a wireless network, a wired network, or a combination of a wired and wireless network. The transmission medium 318 may form part of a packet-based network, such as a local area network, a wide-area network, or a global network such as the Internet. The transmission medium 318 may include routers, switches, base stations, or any other equipment that may be useful to facilitate communication from the source device to the receiving device. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

The device 302 includes one or more processors (referred to herein as "processor") 304 coupled to a memory 306, a first interface ("I/F 1") 312, and a second interface ("I/F 2") 316. The processor 304 is configured to receive image data 308 from the camera 307, from the memory 306, and/or from the storage medium 314. The processor 304 is coupled to the storage medium 314 via the first interface 312 (e.g., via a memory bus) and is coupled to the transmission medium 318 via the second interface 316 (e.g., a network interface device, a wireless transceiver and antenna, one or more other network interface devices, or a combination thereof).

The processor 304 includes the E2E-NNVC system 310. The E2E-NNVC system 310 includes an encoder portion 362 and a decoder portion 366. In some implementations, the E2E-NNVC system 310 can include one or more auto-encoders. The encoder portion 362 is configured to receive input data 370 and to process the input data 370 to generate output data 374 at least partially based on the input data 370.

In some implementations, the encoder portion 362 of the E2E-NNVC system 310 is configured to perform lossy compression of the input data 370 to generate the output data 374, so that the output data 374 has fewer bits than the input data 370. The encoder portion 362 can be trained to compress input data 370 (e.g., images or video frames) without using motion compensation based on any previous representations (e.g., one or more previously reconstructed frames). For example, the encoder portion 362 can compress a video frame using video data only from that video frame, and without using any data of previously reconstructed frames. Video frames processed by the encoder portion 362 can be referred to herein as intra-predicted frame (I-frames). In some examples, I-frames can be generated using traditional video coding techniques (e.g., according to HEVC, VVC, MPEG-4, or other video coding Standard). In such examples, the processor 304 may include or be coupled with a video coding device (e.g., an encoding device) configured to perform block-based intra-prediction, such as that described above with respect to the HEVC Standard. In such examples, the E2E-NNVC system 310 may be excluded from the processor 304.

In some implementations, the encoder portion 362 of the E2E-NNVC system 310 can be trained to compress input data 370 (e.g., video frames) using motion compensation based on previous representations (e.g., one or more previously reconstructed frames). For example, the encoder portion 362 can compress a video frame using video data from that video frame and using data of previously reconstructed frames. Video frames processed by the encoder portion 362 can be referred to herein as intra-predicted frame (P-frames). The motion compensation can be used to determine the data of a current frame by describing how the pixels from a previously reconstructed frame move into new positions in the current frame along with residual information.

As shown, the encoder portion 362 of the E2E-NNVC system 310 can include a neural network 363 and a quantizer 364. The neural network 363 can include one or more transformers, one or more convolutional neural networks (CNNs), one or more fully connected neural networks, one or more gated recurrent units (GRUs), one or more Long Short-Term Memory (LSTM) networks, one or more ConvRNNs, one or more ConvGRUs, one or more ConvL-STMs, one or more GANs, any combination thereof, and/or other types of neural network architectures that generate(s) intermediate data 372. The intermediate data 372 is input to the quantizer 364. Examples of components that may be included in the encoder portion 362 are illustrated in FIG. 5A and FIG. 6A.

The quantizer 364 is configured to perform quantization and in some cases entropy coding of the intermediate data 372 to produce the output data 374. The output data 374 can include the quantized (and in some cases entropy coded) data. The quantization operations performed by the quantizer 364 can result in the generation of quantized codes (or data representing quantized codes generated by the E2E-NNVC system 310) from the intermediate data 372. The quantization codes (or data representing the quantized codes) can also be referred to as latent codes or as a latent (denoted as z). The entropy model that is applied to a latent can be referred to herein as a "prior". In some examples, the quantization and/or entropy coding operations can be performed using existing quantization and entropy coding operations that are performed when encoding and/or decoding video data according to existing video coding standards. In some examples, the quantization and/or entropy coding operations can be done by the E2E-NNVC system 310. In one illustrative example, the E2E-NNVC system 310 can be trained using supervised training, with residual data being used as input and quantized codes and entropy codes being used as known output (labels) during the training.

The decoder portion 366 of the E2E-NNVC system 310 is configured to receive the output data 374 (e.g., directly from quantizer 364 and/or from the storage medium 314). The decoder portion 366 can process the output data 374 to generate a representation 376 of the input data 370 at least partially based on the output data 374. In some examples, the decoder portion 366 of the E2E-NNVC system 310 includes a neural network 368 that may include one or more transformers, one or more CNNs, one or more fully connected neural networks, one or more GRUs, one or more LSTM networks, one or more ConvRNNs, one or more ConvGRUs, one or more ConvLSTMs, one or more GANs, any combination thereof, and/or other types of neural network architectures. Examples of components that may be included in the decoder portion 366 are illustrated in FIG. 5B and FIG. 6A.

The processor 304 is configured to send the output data 374 to at least one of the transmission medium 318 or the storage medium 314. For example, the output data 374 may be stored at the storage medium 314 for later retrieval and decoding (or decompression) by the decoder portion 366 to generate the representation 376 of the input data 370 as reconstructed data. The reconstructed data can be used for various purposes, such as for playback of video data that has been encoded/compressed to generate the output data 374. In some implementations, the output data 374 may be decoded at another decoder device that matches the decoder portion 366 (e.g., in the device 302, in the second device 390, or in another device) to generate the representation 376 of the input data 370 as reconstructed data. For instance, the second device 390 may include a decoder that matches (or substantially matches) the decoder portion 366, and the output data 374 may be transmitted via the transmission medium 318 to the second device 390. The second device 390 can process the output data 374 to generate the representation 376 of the input data 370 as reconstructed data.

The components of the system 300 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 300 is shown to include certain components, one of ordinary skill will appreciate that the system 300 can include more or fewer components than those shown in FIG. 3. For example, the system 300 can also include, or can be part of a computing device that includes, an input device and an output device (not shown). In some implementations, the system 300 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 3.

In some implementations, the system 300 can be implemented locally by and/or included in a computing device. For example, the computing device can include a mobile device, a personal computer, a tablet computer, a virtual reality (VR) device (e.g., a head-mounted display (HMD) or other VR device), an augmented reality (AR) device (e.g., an HMD, AR glasses, or other AR device), a wearable device, a server (e.g., in a software as a service (SaaS) system or other server-based system), a television, and/or any other computing device with the resource capabilities to perform the techniques described herein.

In one example, the E2E-NNVC system 310 can be incorporated into a portable electronic device that includes the memory 306 coupled to the processor 304 and configured to store instructions executable by the processor 304, and a wireless transceiver coupled to an antenna and to the processor 304 and operable to transmit the output data 374 to a remote device.

Figure 4:
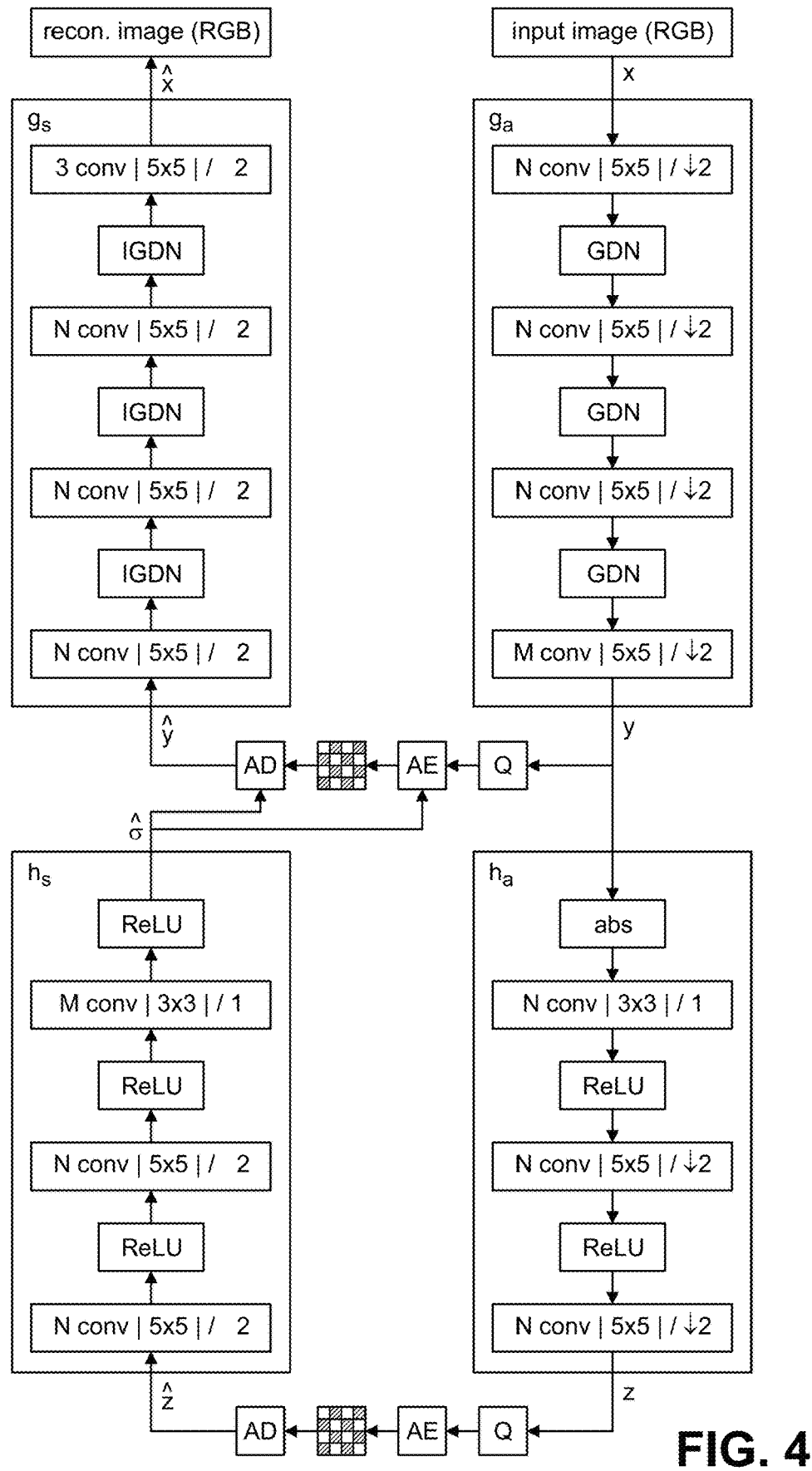
FIG. 4 is a diagram illustrating an example of an end-to-end neural network-based image and video coding system for input having a red-green-blue (RGB) format, in accordance with some examples.

FIG. 4 is a diagram illustrating an example of an E2E-NNVC system that uses convolutional neural network layers to implement a hyperprior model for image and/or video coding. The $g_a$ and $g_s$ sub-networks in the E2E-NNVC system of FIG. 4 correspond to the encoder sub-network (e.g., the encoder portion 362) and the decoder sub-network (e.g., the decoder portion 366), respectively. The $g_a$ and $g_s$ sub-networks of FIG. 4 are designed for three-channel RGB input, where all three R, G, and B input channels go through and are processed by the same neural network layers (the convolutional layers and generalized divisive normalization (GDN) layers). E2E-NNVC systems (such as that shown in FIG. 4) can target input channels with similar statistical characteristics, such as RGB data (where statistical properties of the different R, G, and B channels are similar) and/or YUV data. However, as discussed previously, CNNs trained to perform image coding are still unable to achieve low latency performance of either encoding or decoding operations, such as based on the use of autoregressive priors (which result in slow decode times).

As previously noted, systems and techniques are described herein for performing image and/or video coding (e.g., low latency encoding and decoding) using one or more transformer neural networks. The transformer neural networks can include transformer blocks and/or transformer layers that are organized according to, for example, the hyperprior architecture of FIG. 4 and/or the scale-space flow (SSF) architecture of FIG. 6B described below. For example, the four convolutional networks $g_a$, $g_s$, $h_a$, and $h_s$ that are depicted in FIG. 4 can instead be provided as a corresponding four transformer neural networks, as will be explained in greater depth below.

In some examples, one or more transformer-based neural networks described herein can be trained using a loss function that is based at least in part on rate distortion. Distortion may be determined as the mean square error (MSE) between an original image (e.g., an image that would be provided as input to an encoder sub-network) and a decompressed/decoded image (e.g., the image that is reconstructed by a decoder sub-network). In some examples, a loss function used in training a transformer-based media coding neural network can be based on a trade-off between distortion and rate with a Lagrange multiplier. One example of such a rate-distortion loss function is L=D+β*R, where D represents distortion, R represents rate, and different β values represent models trained for different bitrates and/or peak-signal-to-noise ratios (PSNR).

In one illustrative example, unsupervised learning techniques (without supervision) can be used to train one or more of the transformer-based neural networks described herein. In an unsupervised training process, it may not be necessary to label or categorize portions of or elements within the training data. For instance, a backpropagation training process can be used to adjust weights (and in some cases other parameters, such as biases) of the nodes of the neural network, e.g., an encoder and/or decoder sub-network, such as those depicted in FIGS. 5A and 5B, respectively). Backpropagation includes a forward pass, a loss function, a backward pass, and a weight update. In some examples, the loss function can include the rate-distortion-based loss function described above. The forward pass, loss function, backward pass, and parameter update can be performed for one training iteration. The process is repeated for a certain number of iterations for each set of training data until the weights of the parameters of the encoder or decoder sub-network are accurately tuned.

The loss (or error) may be high for the first training data inputs, since the actual output values may be significantly different than the training data outputs. A goal of training is to minimize the amount of loss (e.g., rate-distortion loss, such as using the loss function L=D+β*R) for the predicted output. The neural network performs a backward pass by determining which inputs (weights) most contributed to the loss of the neural network, and adjusts the weights so the loss decreases and is eventually minimized. A derivative of the loss with respect to the weights (denoted as dL/dW, where W are the weights at a particular layer) is computed to determine the weights that most contributed to the loss of the neural network. For example, the weights are updated so they change in the opposite direction of the gradient. The weight update is denoted as $$w = w_i - \eta \frac{dL}{dW},$$

where w denotes a weight, $w_i$ denotes the initial weight, and η denotes a learning rate. The learning rate is set to any suitable value, with a high learning rate including larger weight updates and a lower value indicating smaller weight updates. An encoder or decoder sub-network, or a constituent shifted window transformer layer or block of one such sub-network, continues to be trained in such a manner until a desired output is achieved. In some cases, each of the components of an encoder sub-network and/or a decoder sub-network is trained in a similar manner.

Figure 6A:
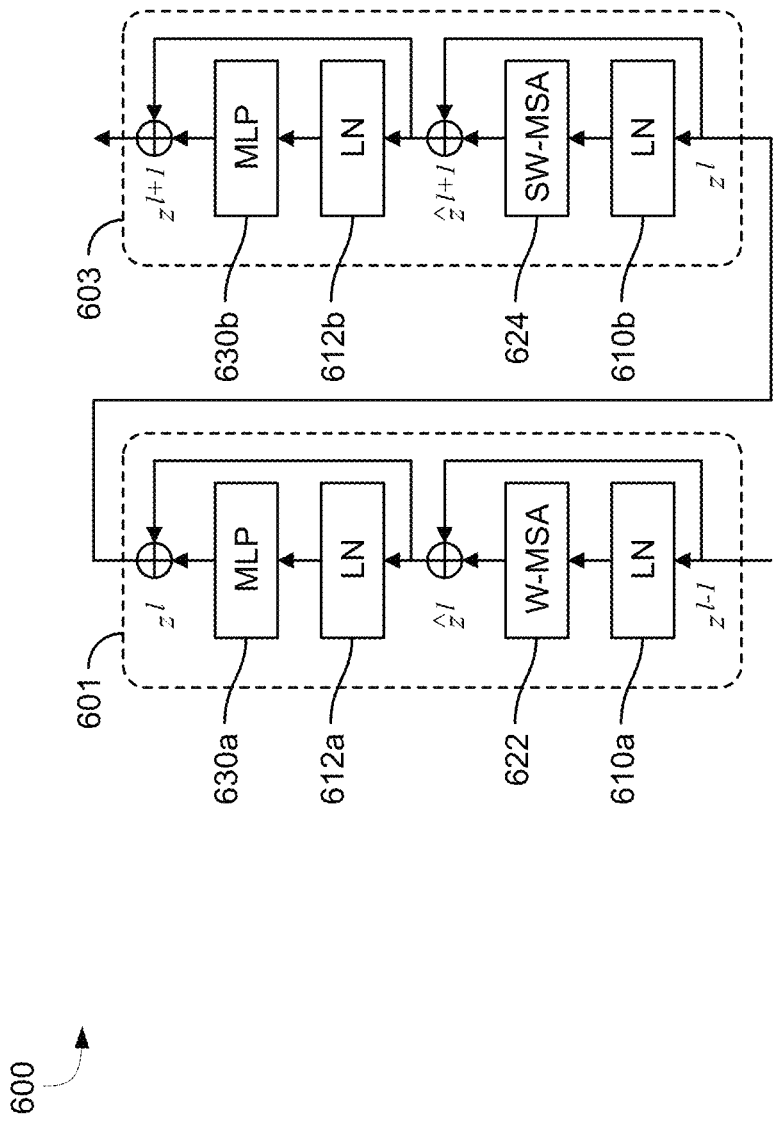
FIG. 6A is a diagram illustrating an example architecture of a pair of shifted window transformer blocks, in accordance with some examples.
Figure 6B:
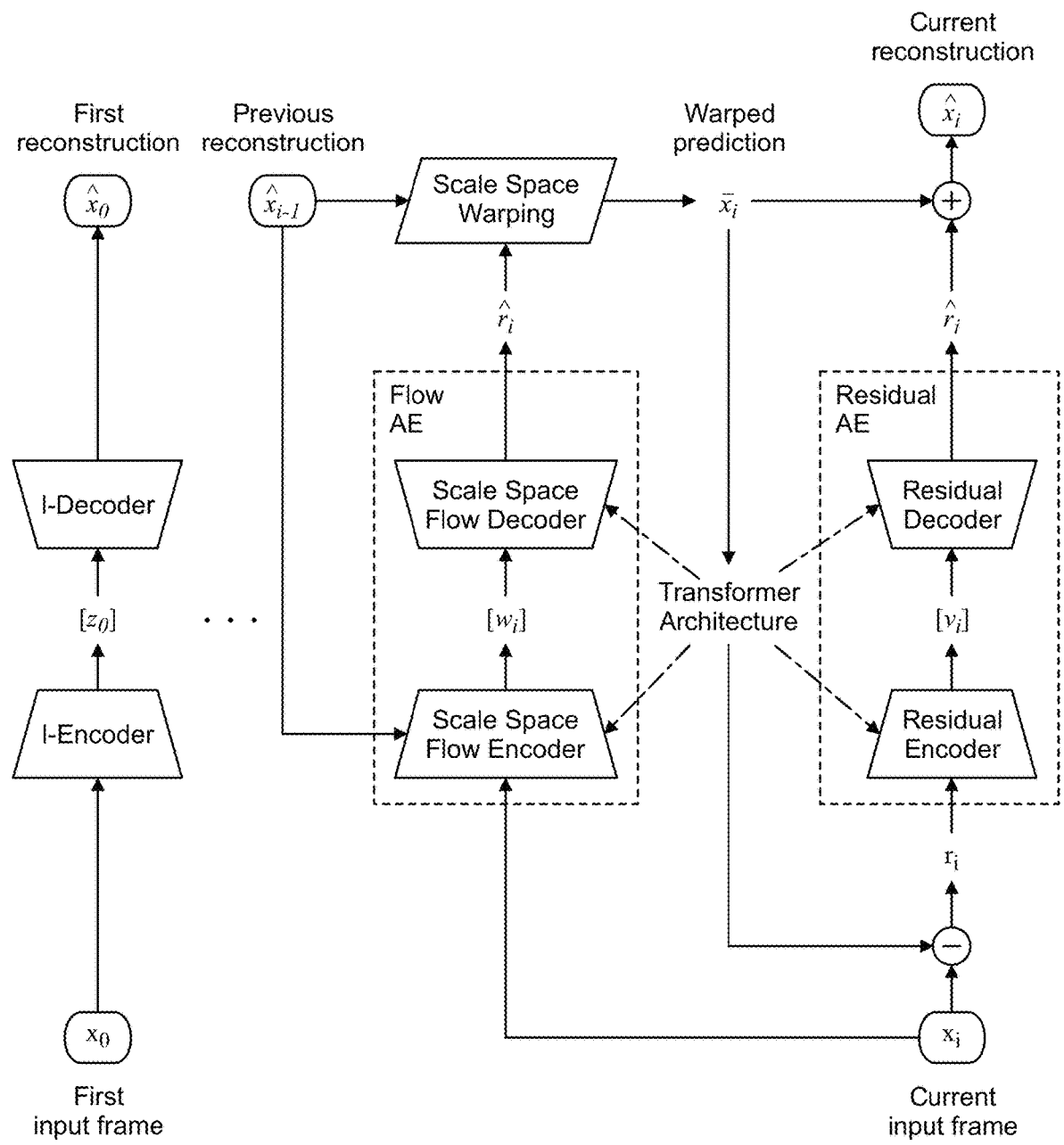
FIG. 6B is a diagram illustrating an example of a video coding system using one or more transformer-based neural network architectures, in accordance with some examples.
Figure 7A:
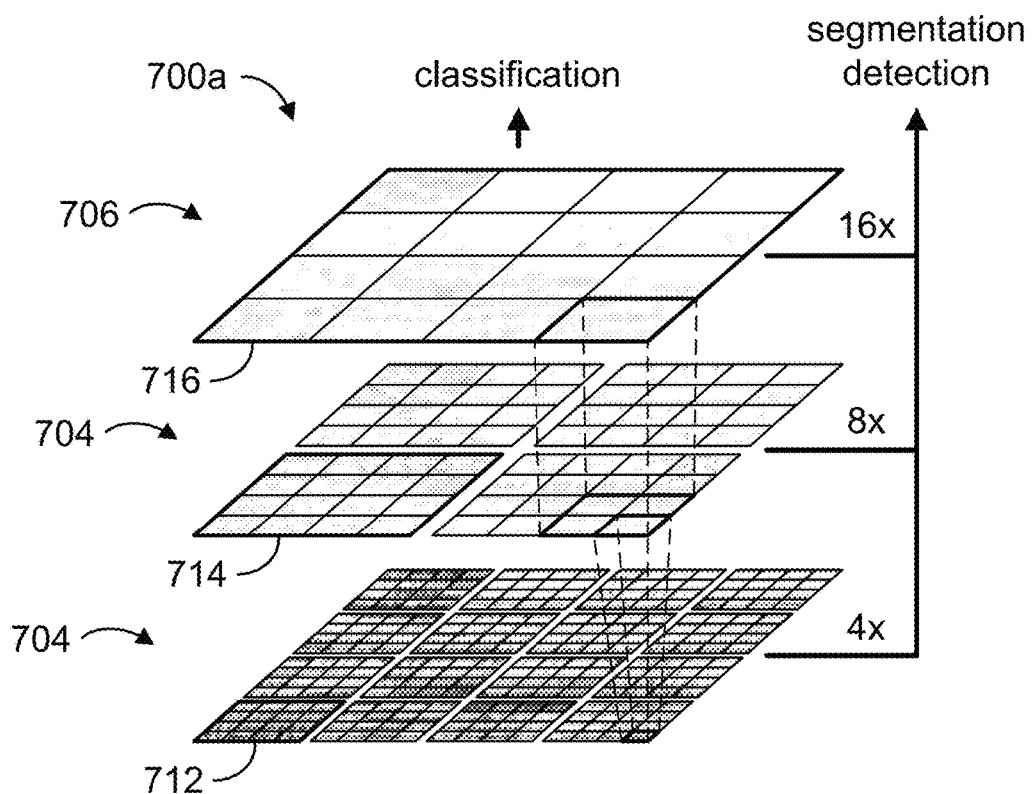
FIG. 7A is a diagram illustrating an example of a patch merging or patch un-merging process that can be applied between transformer layers of an encoder or decoder neural network-based image and video coding system, in accordance with some examples.
Figure 7B:
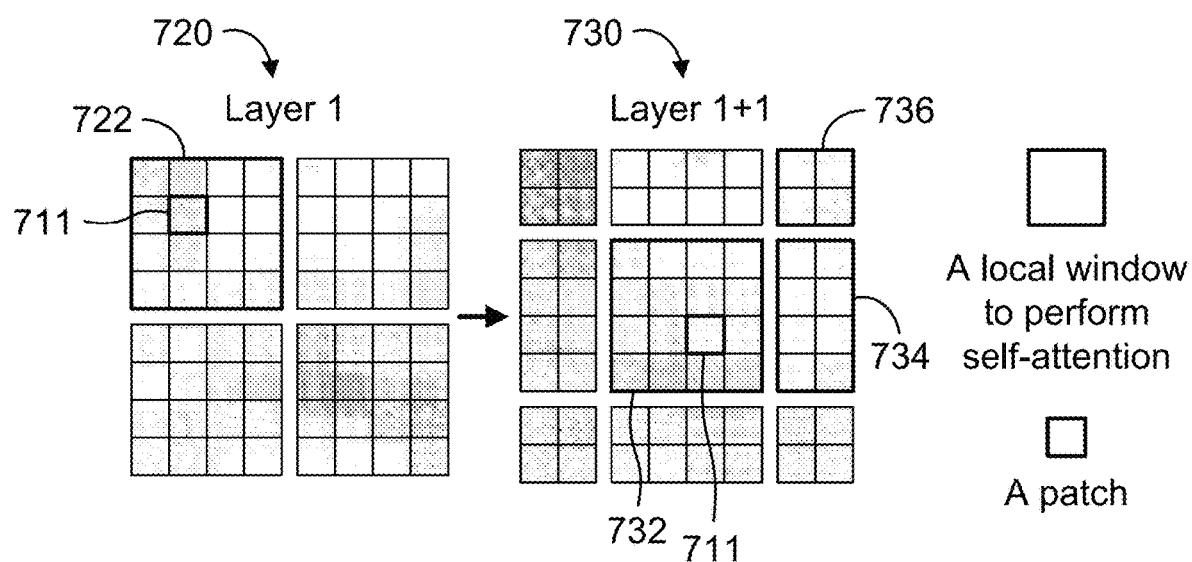
FIG. 7B is a diagram illustrating an example of a shifted window self-attention calculation between two self-attention layers of an encoder or decoder neural network-based image and video coding system, in accordance with some examples.

FIGS. 5A and 5B are introduced briefly below, before turning to a discussion of FIGS. 6-7B, which provide an example architecture of shifted window transformer blocks (FIG. 6A), an example of patch merging between shifted window transformer layers (FIG. 7A), and an example of shifted window self-attention performed by pairs of transformer blocks within a given transformer layer (FIG. 7B). Following the above examples, the discussion then returns to FIGS. 5A and 5B in further detail.

FIG. 5A depicts an example architecture of an encoder sub-network 500a having a series of transformer layers 520, 530, 540, 550. In some examples, encoder sub-network 500a can be trained to perform a non-linear transform that converts an input image 502 into a latent representation 555a. In some cases, the non-linear transform is also an analysis transform. As illustrated, each encoder transformer layer can include a set of consecutively arranged shifted window transformer blocks 524, 534, 544, and 554, respectively (also referred to herein as "encoder transformer block sets" or "transformer block sets"). In some examples, the encoder transformer block sets 524-554 can include one or more pairs of shifted window transformer blocks, such as the example pair of shifted window transformer blocks illustrated in FIG. 6A.

For example, the total number of shifted window transformer blocks provided in an encoder transformer block set from encoder block sets 524-554 can be a multiple of two (e.g., two shifted window transformer blocks in transformer block set 524, two shifted window transformer blocks in transformer block set 534, six shifted window transformer blocks in transformer block set 544, and two shifted window transformer blocks in transformer block set 554, as illustrated by the "×2", "×6", and similar notation in FIG. 5A). An example of a transformer block set with two shifted window transformer blocks is shown in FIG. 6A and described below. In some cases, pairs of shifted window transformer blocks can correspond to a two-step self-attention calculation process that alternates use between two partitioning configurations to compute self-attention over consecutive shifted window transformer blocks (e.g., as will be described with respect to FIG. 6A and FIG. 7B).

FIG. 5B depicts an example architecture of a decoder sub-network 500b having a patch partitioning engine 510b and a series of transformer layers 560, 570, 580, 590. The patch partitioning engine 510b can operate similarly as the patch partitioning engine 510a of the encoder sub-network 500a. In some examples, decoder sub-network 500b can be trained to perform a non-linear transform that converts a latent representation 555b into a reconstructed image 504. In some cases, the non-linear transform is also a synthesis transform. Latent representation 555b can be the same as the latent representation 555a that is output by encoder sub-network 500a, such as in the case that that there is no information loss or damage in the quantization, entropy coding, and/or data transmission processes that communicate the latent representation 555a from the encoder sub-network 500a to the decoder sub-network 500b. As illustrated, each decoder transformer layer can include a set of consecutively arranged shifted window transformer blocks 564, 574, 584, and 594, respectively (also referred to herein as "decoder transformer block sets" or "transformer block sets"). In some examples, the decoder transformer block sets 564-594 can include one or more pairs of shifted window transformer blocks, such as the example pair of shifted window transformer blocks illustrated in FIG. 6A. For example, the total number of shifted window transformer blocks provided in a decoder transformer block set from the transformer decoder block sets 564-594 can be a multiple of two (e.g., two shifted window transformer blocks in transformer block set 564, six shifted window transformer blocks in transformer block set 574, two shifted window transformer blocks in transformer block set 584, and two shifted window transformer blocks in transformer block set 594, as illustrated by the "×2", "×6", and similar notation in FIG. 5B). In some cases, the pairs of shifted window transformer blocks can correspond to a two-step self-attention calculation process that alternates use between two partitioning configurations to compute self-attention over consecutive shifted window transformer blocks (e.g., as will be with respect to FIG. 6A and FIG. 7B).

It is noted that in some examples, some or all of the description made herein with reference to encoder sub-network 500a can also be applied to decoder sub-network 500b. For example, in some cases one or more of the decoder transformer layers 560-590 can utilize shifted window transformer blocks that are identical to or otherwise share a common architecture with the shifted window transformer blocks of the encoder transformer layers 520-550. Moreover, in some examples the architecture of decoder sub-network 500b can be symmetric to the architecture of encoder sub-network 500a, with the decoder sub-network 500b using patch un-merging engines 563, 573, 583 instead of patch merging engines 532, 542, 552 of the encoder sub-network 500a. Symmetry between the architectures of decoder sub-network 500b and encoder sub-network 500a can include the use of the same architectural arrangement or configuration of the constituent shifted window transformer blocks provided in the decoder and encoder sub-networks.

Figure 5C:
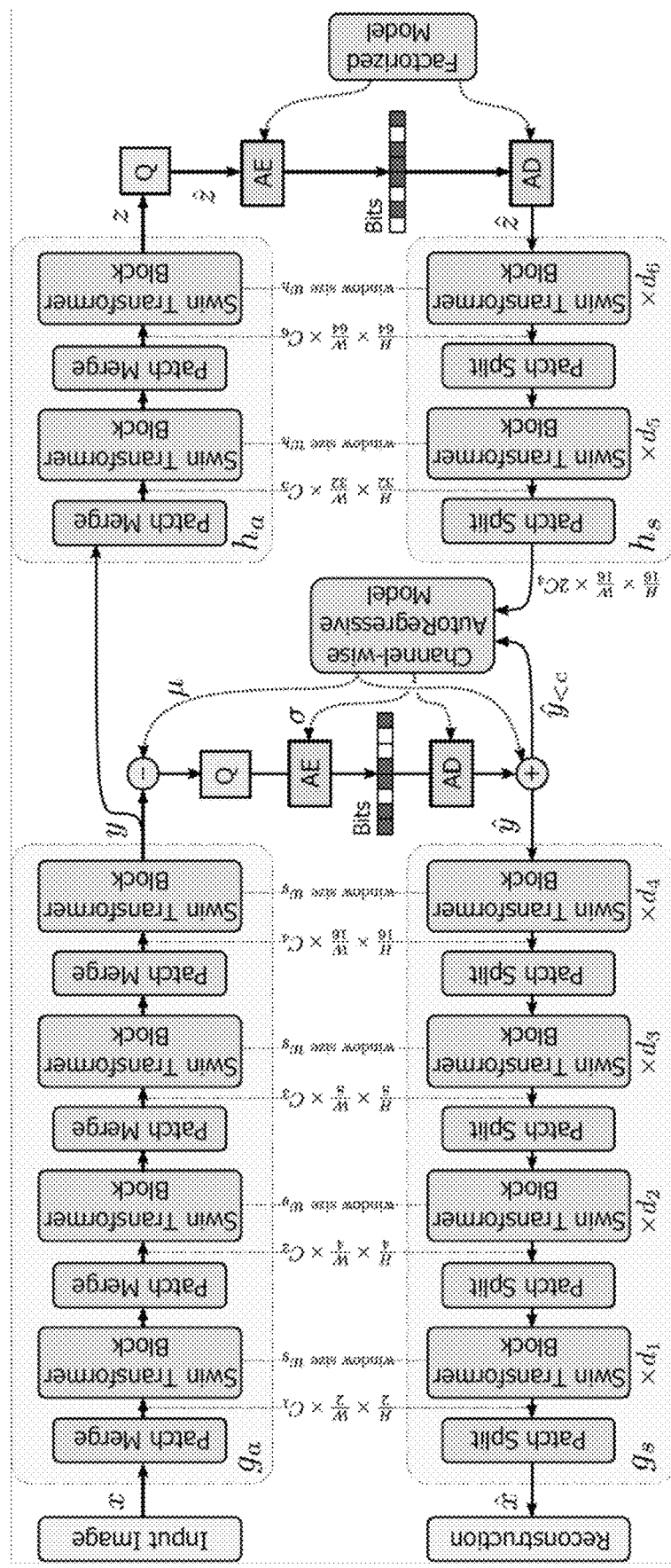
FIG. 5C is a diagram illustrating an example of a transformer-based end-to-end neural network architecture for a neural network-based image and video coding system, in accordance with some examples.

FIG. 5C is a diagram illustrating an example of a transformer-based end-to-end neural network architecture for a neural network-based image and video coding system. In some cases, the transformer-based end-to-end neural network architecture of FIG. 5C can include the encoder sub-network 500a of FIG. 5A and the decoder sub-network 500b of FIG. 5B. The patch-splitting engine (shown as "patch split" in FIG. 5C) can be similar to and perform the same operations as the patch un-merging engines shown in FIG. 5B.

The discussion turns now to the examples depicted in FIGS. 6-7B, before returning to FIGS. 5A and 5B. As mentioned previously, FIGS. 6-7B provide an example architecture of the shifted window transformer blocks (FIG. 6A), an example of patch merging between shifted window transformer layers (FIG. 7A), and an example of shifted window self-attention performed by pairs of transformer blocks within a given transformer layer.

FIG. 6A depicts an example architecture 600 of a first shifted window transformer block 601 and a second shifted window transformer block 603, collectively referred to as a transformer block pair. As illustrated, the first shifted window transformer block 601 includes a layer norm 610a; a self-attention component 622 (also referred to as a "first self-attention layer"); a layer norm 612a; and a feed-forward neural network component 630a, depicted as a multi-layer perceptron (MLP). The second shifted window transformer block 603 includes a layer norm 610b; a self-attention component 624 (also referred to as a "second self-attention layer"); a layer norm 612b; and a feed-forward neural network component 630b, depicted again as an MLP.

In some examples, the first shifted window transformer block 601 can be the same as the second shifted window transformer block 603, with the exception of their respective self-attention layers 622 and 624, which apply different window partitioning configurations. In some cases, first self-attention layer 622 can comprise windowed multi-head self-attention (W-MSA) and second self-attention layer 624 can comprise shifted window multi-head self-attention (SW-MSA).

In some examples, the first self-attention layer 622 of the first shifted window transformer block 601 can use a shift window with shift size=0 (corresponding to no shift). For example, when the window size is 8, the first attention layer (e.g., first self-attention layer 622) can use a shift size=0, the second attention layer (that follows the first attention layer, such as second self-attention layer 624) can use a shift size=4, the third attention layer (that follows the second attention layer) can use shift size=0 again, the fourth attention layer (that follows the third attention layer) can use a shift size=4, and so on for the number of shifted window transformer blocks in a given transformer block set (e.g., as illustrated by the "×2", "×6", and similar notation in FIG. 5A and FIG. 5B). Alternating shift size values (e.g., alternating shift=0 and shift=4) results in the effect of propagating signals across windows. In some cases, it is not necessary to have shift=4 after shift=0, as the shift size can be variable.

In some examples, first self-attention layer 622 can apply a non-overlapping window partitioning configuration (such as configuration 720 of FIG. 7B) to divide a set of patches into non-overlapping windows that each contain multiple patches. The first self-attention layer 622 can then compute self-attention locally within each window. The first self-attention layer 622 can provide the self-attention information to the layer norm 612a layer (e.g., a Softmax layer). For example, the first self-attention layer 622 can compute self-attention values by computing a matrix of outputs as:

$$\text{Attention}(Q, K, V) = \text{softmax}\left(\frac{QK^T}{\sqrt{d_k}}\right)V$$

Where the matrix $Q=W_q X$, the matrix $K=W_k X$, and the matrix $V=W_v X$, and the input to Q, K, V are the same X (and thus "self"). The $W_q$, $W_k$, and $W_v$ terms are linear layers that project or map the input vector X to query (Q), key (K), and value (V) matrices. The term $d_k$ refers to a dimension of a key k, with $\sqrt{d_k}$ acting as a scaling factor. Softmax refers to a softmax function that is used obtain weights on the self-attention values. The layer norm 612a can output the weights to the feedforward neural network component 630a (e.g., a multi-layer perceptron (MLP) layer). The output of first shifted window transformer block 601 can then be provided as input to second shifted window transformer block 603.

In the second self-attention layer 624, the window partitioning is shifted, resulting in new windows that overlap those of the first self-attention layer 622. For example, a shifted window partitioning configuration (such as configuration 730 of FIG. 7B) can be applied by second self-attention layer 624. The self-attention computation in the shifted windows of second self-attention layer 624 crosses the boundaries of the previous windows in first self-attention layer 622, resulting in cross-window connections that can be provided to the layer norm 612b. The layer norm 612b can provide an output to feedforward neural network component 630b.

By determining self-attention locally, the transformer-based image and video coding system described herein can achieve greater efficiency and computational performance that supports low latency encoding and decoding. For example, in some aspects, the transformer-based image and video coding system has linear computational complexity to image size. By obtaining cross-window connections via the second self-attention layer, the transformer-based image and video coding system can achieve a rate-distortion loss that matches or betters the rate-distortion loss associated with CNN-based and other existing approaches.

FIG. 7A illustrates an example process of merging image patches in deeper encoder transformer layers (e.g., bottom to top) in the context of the encoder sub-network 500a, and will be described in more detail below. FIG. 7B illustrates an example of two different window partitioning configurations, including window partitioning configuration 720 and window partitioning configuration 730. Window partitioning configuration 720 depicts a non-overlapping window partitioning applied over a set of patch tokens, and in some examples may be utilized by the first self-attention layer 622 of FIG. 6A. An example of a non-overlapping window partition is indicated at 722 and an example of one of its constituent patch tokens is indicated at 711. In some examples, the first shifted window transformer block 601 of FIG. 6A can apply the non-overlapping window partitioning configuration 720 using self-attention component 622.

Window partitioning configuration 730 depicts a shifted window partitioning applied over a set of patch tokens, and in some examples may be utilized by the second self-attention layer 624 of FIG. 6A. In some cases, the two window partitioning configurations 720 and 730 can be applied over the same set of patch tokens.

In some examples, the non-overlapping window partitioning configuration 720 divides the set of input patch tokens into equally sized windows, shown here as 4×4 windows containing 16 patch tokens, although other window geometries and/or sizes can also be utilized. The shifted window partitioning configuration 730 can utilize windows that are displaced relative to those of the non-overlapping partitioning configuration 720. For example, shifted windows 732 and 734 have been displaced such that they each contain a set of tokens that were previously contained in multiple different ones of the non-overlapping windows of partitioning configuration 720. Because a single shifted window contains patch tokens from multiple non-overlapping windows of the previous self-attention layer, the previously mentioned cross-window connections can thereby be introduced. As illustrated, the shifted window partitioning configuration 730 uses the same 4×4 window size as the non-overlapping window partitioning configuration, with clipping or truncation of the window size where it extends beyond the boundaries of the patch token set. However, in some examples the shifted window portioning configuration 730 and the non-overlapping window partitioning configuration 720 can use different window sizes.

Returning now to the encoder and decoder sub-networks depicted in FIGS. 5A and 5B, as depicted in FIG. 5A the first transformer layer 520 of encoder sub-network 500a includes two shifted window transformer blocks (e.g., denoted by the "×2" label beneath the shifted window transformer block 524); transformer layer 530 includes two shifted window transformer blocks; transformer layer 540 includes six shifted window transformer blocks; and transformer layer 550 includes two shifted window transformer blocks. It is noted that in some examples one or more of the transformer layers described herein can each include a greater or lesser number of shifted window transformer blocks than depicted in the example of FIG. 5A.

The transformer layers 520-550 (and their constituent shifted window transformer blocks) can in some examples be based on vision transformers. Vision transformers are a type of transformer architecture that is configured to operate on image-based inputs. Image-based inputs can include still images (e.g., photographs or other types of still images) and video images (e.g., frames of a video). Under the vision transformer architecture, an input image is first partitioned into a plurality of non-overlapping patches, which are then projected into a linear space in order to obtain vectors upon which the vision transformer(s) may operate.

The encoder sub-network 500a includes a patch partitioning engine 510a that splits an input image 502 into non-overlapping patches (an example of two patch partitioning operations is depicted in FIG. 7A). Input image 502 is indicated as having dimensions of H×W×3, where H indicates height in pixels, W indicates width in pixels, and the number 3 indicates the dimensionality of the input image (one dimension for each color channel of the input image, e.g., R, G and B). Each patch can have the same or similar size, e.g., given by a number of pixels in the height and width dimension. In some examples, the size of the patches generated by patch partitioning engine 510a can be pre-determined. As illustrated, the pre-determined patch size is 4×4, such that the patches generated by patch partitioning engine 510a include 16 pixels arranged in a square of four pixels per side, although other sizes and/or height-to-width ratios can also be utilized. Additionally, it is noted that patch partitioning engine 510 can partition input image 502 into patches as part of the process flow of encoder sub-network 500a or can partition input image 502 into patches in advance. In some examples, the patches generated by patch partitioning engine 510a are treated as tokens (also referred to as "patch tokens"), with the feature for each token set as the concatenation of the constituent raw pixel RGB values of the patch. In the illustrated example, the feature dimension of each 4×4 patch is 48 (e.g., 4×4×3=48), as indicated by the label $$\frac{H}{4} \times \frac{W}{4} \times 48$$

detailing the set of input patches provided to transformer layer 520.

From patch partitioning model 510a, the set of non-overlapping patches generated from input image 502 are provided to a first transformer layer 520. As illustrated, first transformer layer 520 includes a linear embedding layer 521, which is applied on the raw-valued features of each patch in order to project them to an arbitrary dimension C, such as by applying a linear transform. In some examples, linear embedding layer 521 can be external to or otherwise separate from first transformer layer 520, and for example may be provided in combination with patch partitioning engine 510a. Additionally, it is noted that linear embedding layer 521 appears only in first transformer layer 520—the successive transformer layers 530, 540, 550 lack a linear embedding layer but include patch merging engines 532, 542, 552, respectively.

The shifted window transformer blocks 524 are then applied over the patch tokens. As mentioned previously, the series of shifted window transformer blocks 524 is shown as including two consecutive shifted window transformer blocks, e.g., such as the two seen in FIG. 6A. The shifted window transformer blocks 524 perform a modified self-attention computation (described in greater depth with respect to FIGS. 6 and 7A-B) to generate one or more attention vectors, which are then used for feature transformation. The output of the shifted window transformer blocks 524 is subsequently provided as input to a second transformer layer 530, in which both the number of patch tokens $$(\text{e.g., } \frac{H}{4} \times \frac{W}{4})$$

and the linear embedding are maintained.

To produce a hierarchical representation or feature map from the input image 502, the transformer layers 530, 540, and 550 each include a respective patch merging engine 532, 542, 552. The patch merging engine 532, 542, 552 can be applied to reduce the number of patch tokens over which the transformer layer will operate. As illustrated, the patch merging engines 532-552 are provided prior to the shifted window transformer blocks 534-554 in each transformer layer. In some examples, one or more of the transformer layers 530-550 can be configured such that the output of its patch merging engine is directly coupled to the input of its series of shifted window transformer blocks.

In some examples, the patch merging engine 532 is configured to divide the set of patches from the preceding transformer layer 520 into non-overlapping groups of neighboring patches or blocks. The patch merging engine 532 can concatenate the patch features within each group and can generate a single, new patch for each concatenated group. In one illustrative example, the patch merging operation performed by the patch merging engines 532, 542, 552 can include rearranging blocks of spatial data into depth. In particular, the patch merging operation can include outputting a copy of an input tensor where values from height and width dimensions are moved to the depth dimension. The non-overlapping patches or blocks of size of block_size× block_size (where block_size represents the spatial size of input blocks or patch to be rearranged to a depth/channel dimension) are rearranged into depth at each location of the blocks or patch (since each input patch of size block_size× block_size will be collapsed to one pixel in the output). The depth of the output tensor is block_size*block_size*input_depth. The vertical (Y) and horizontal (X) coordinates within each block of the input become the high order component of the output channel index. The height and width of the input tensor are divisible by block_size. In some examples, the encoder sub-network 500a can apply linear layers after the patch merging operation to change the number of channels of the features. Similar operations can be performed by the patch merging engine 542 and the patch merging engine 552. Accordingly, the patch merging engines 532-552 can reduce the number of patch tokens provided to each consecutive transformer layer 530-550 by a factor equal to the number of patches per merged group. As noted above, FIG. 7A illustrates an example process of merging image patches in deeper encoder transformer layers (e.g., bottom to top) in the context of the encoder sub-network 500a.

Referring to FIG. 5B, the transformer layers 560, 570, and 580 of the decoder sub-network 500b each include a respective patch un-merging engine 563, 573, and 583 (also referred to as patch splitting engines). The patch un-merging engines 563, 573, 583 can perform a patch un-merging process to upsample (increase the size of) feature maps. The patch un-merging process is an inverse process of the patch merging process performed by the patch merging engines 532-552. In some examples, the patch un-merging engine 563 is configured to split the non-overlapping groups of neighboring patches from a preceding block or layer (e.g., a shifted window transformer block in the same transformer layer) from one pixel with four channels into four pixels with one channel (in the event the upscale factor is 2). For instance, in one illustrative example, the patch un-merging operation performed by the patch un-merging engine 563, 573, and 583 can include rearranging elements in a tensor of shape (*, C×r², H, W) to a tensor of shape (*, C, H×r, W×r), where r is an upscale factor. In some examples, the decoder sub-network 500b can apply linear layers after the patch un-merging operation to change the number of channels of the features. FIG. 7A can also be seen to illustrate an example process of un-merging image patches in deeper decoder transformer layers (e.g., top to bottom) in the context of the decoder sub-network 500b.

At a first layer 702, image data is represented as having been partitioned into a 16×16 grid of patches, where each patch contains some number of discrete pixels from the original input image 502. Patch merging is applied between first layer 702 and second layer 704, and between second layer 704 and third layer 706. In some examples, the layers 702, 704, 706 can be the same as transformer layers 520, 530, 540, respectively, and the patch merging process described above can be performed by patch merging engines 532 and 542.

Between first layer 702 and second layer 704, patch merging is performed by concatenating features from 2×2 groups of neighboring patches (e.g., of first layer 702) into a single patch (e.g., of second layer 704) and applying a linear layer on the concatenated features. As such, the single merged patch in second layer 704 contains concatenated features from four separate patches in first layer 702. The total number of patches has been reduced by a factor of four, resolution has been downsampled by a factor of two, and the output dimension of the patch merging process is 2C.

Between second layer 704 and third layer 706, and identical patch merging process can be applied (e.g., in which groups of 2×2 neighboring patches are merged into a single patch). The resulting merged patch in third layer 706 contains concatenated features from four separate patches in second layer 704, or alternatively, can be viewed as containing concatenated features from 16 separate patches in first layer 702. As was the case between first layer 702 and second layer 704, the patch merging process between second layer 704 and third layer 706 again reduces the total number of patches by a factor of four and downsamples resolution by a factor of two. The output dimension of this patch merging process is therefore 4C.

Accordingly, when a repeated patch merging logic is utilized, the patch merging engines 532-552 can be identical to one another, even though each patch merging engine has a different input and output resolution (e.g., patch merging engine 532 has an input patch token resolution of $$\frac{H}{4} \times \frac{W}{4} \times C$$

and an output resolution of $$\frac{H}{8} \times \frac{W}{8} \times 2C;$$

patch merging engine 542 has an input resolution of $$\frac{H}{8} \times \frac{W}{8} \times 2C$$

and an output resolution of $$\frac{H}{16} \times \frac{W}{16} \times 4C;$$

and patch merging engine 552 has an input resolution of $$\frac{H}{16} \times \frac{W}{16} \times 4C$$

and an output resolution of $$\frac{H}{32} \times \frac{W}{32} \times 8C).$$

FIG. 6B is a diagram illustrating an example of a video coding architecture in which one or more transformer-based neural network architectures described herein can be utilized. Using a transformer-based neural network allows the video coding architecture to operate with low latency (e.g., a low-delay video coding architecture). The architecture of the video coding system of FIG. 6B is based on scale space flow (SSF), which extends or generalizes optical flow at least in part by adding a scale parameter to better allow the system to model uncertainty. In the context of FIG. 6B, the scale parameter is associated with the scale space warping component. As illustrated, the SSF video coding architecture uses an SSF encoder and an SSF decoder, collectively labeled as "flow AE" or flow autoencoder, to perform motion compensation. The SSF encoder and the SSF decoder may both be based on one or more convolutional transforms. Similarly, the residual encoder and the residual decoder may also both be based on one or more convolutional transforms. In some cases, the SSF encoder and decoder, as well as the residual encoder and decoder, may each be implemented as CNNs. In some examples, all four of the encoder and decoder components can be provided as four-layer CNNs.

As depicted in FIG. 6B, one or more shifted window transformer neural networks described herein can, in some examples, be used to replace CNNs and/or convolutional transforms in the SSF architecture. For example, one or more shifted window transformer neural networks can be provided to replace the SSF encoder, the SSF decoder, the residual encoder, and/or the residual decoder. In some examples, four shifted window transformer neural networks can replace the four convolutional components in the SSF video coding architecture, as will be described in greater depth below.

Figure 8:
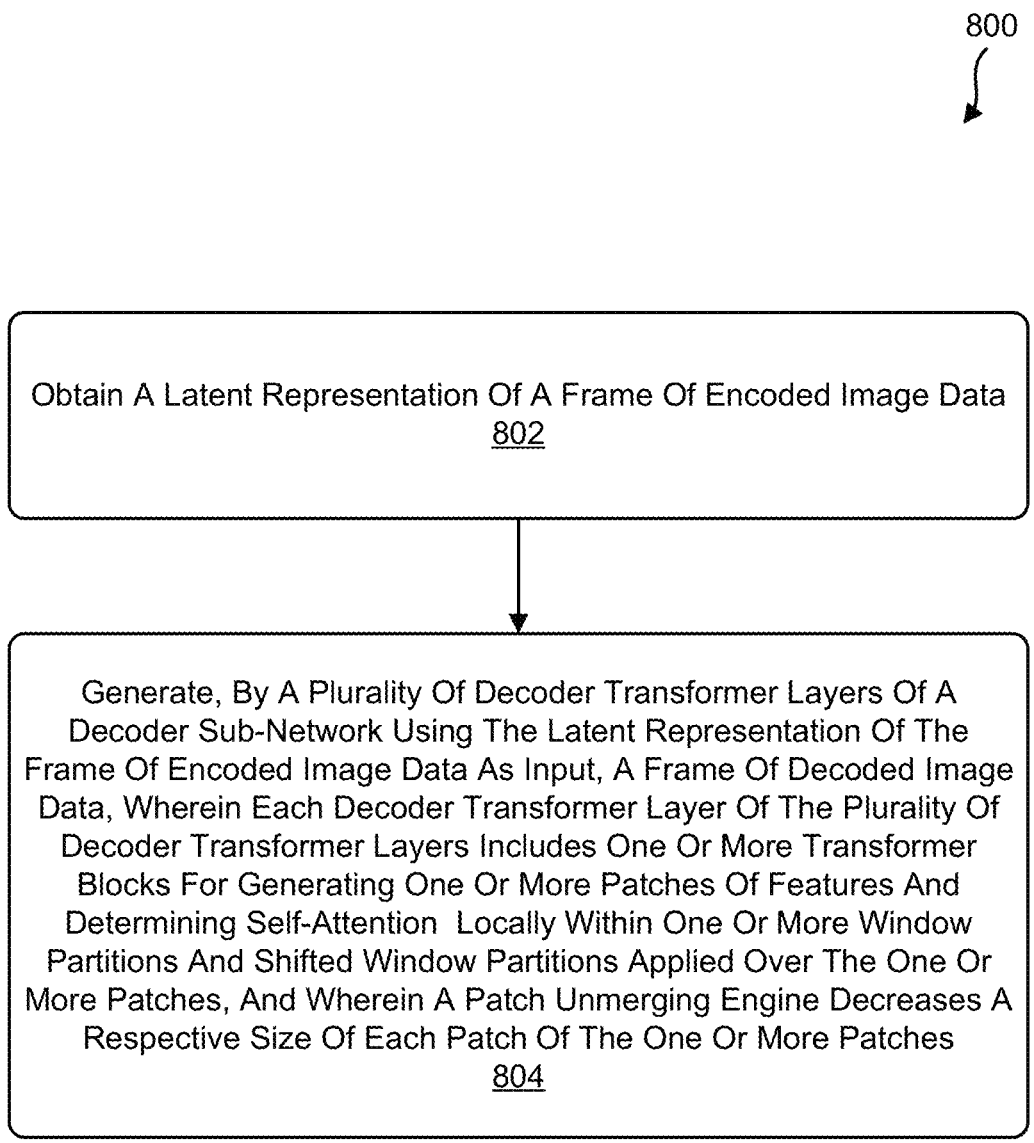
FIG. 8 is a flowchart illustrating an example of a process for processing image and/or video data, in accordance with some examples.

FIG. 8 is a flowchart illustrating an example of a process 800 for processing image and/or video data. At block 802, the process 800 includes obtaining a latent representation of a frame of encoded image data. In some examples, the frame of encoded image data includes an encoded still image. In some examples, the frame of encoded image data includes an encoded video frame.

At block 804, the process 800 includes generating, by a plurality of decoder transformer layers of a decoder sub-network using the latent representation of the frame of encoded image data as input, a frame of decoded image data. In some cases, the plurality of decoder transformer layers include a series of consecutive decoder transformer layers (e.g., the series of decoder transformer layers 560, 570, 580, and 590 shown in FIG. 5B). At least one decoder transformer layer of the plurality of decoder transformer layers includes one or more transformer blocks for generating one or more patches of features and determine self-attention locally within one or more window partitions and shifted window partitions applied over the one or more patches. The at least one decoder transformer layer of the plurality of decoder transformer layers further includes a patch un-merging engine for decreasing a respective size of each patch of the one or more patches. For instance, referring to FIG. 5B as an illustrative example, the decoder transformer layer 560 includes a shifted window transformer block 564 and a patch un-merging engine 563. In some aspects, at least a portion of the one or more transformer blocks included in the at least one decoder transformer layer have a same architecture. In some aspects, each (e.g., all) of the one or more transformer blocks included in the at least one decoder transformer layer have a same architecture.

In some examples, to generate the frame of decoded image data, the process 800 can include determining, by a first transformer block of a first decoder transformer layer of the plurality of decoder transformer layers, self-attention locally within one or more first window partitions applied over the one or more patches. The process 800 can further include determining, by a second transformer block of the first decoder transformer layer, self-attention locally within one or more second window partitions applied over the one or more patches. For instance, the one or more second window partitions may be shifted to overlap one or more boundaries between adjacent ones of the one or more first window partitions (e.g., as shown in FIG. 7A and FIG. 7B). The process 800 can include segmenting, by the patch un-merging engine, each patch of the one or more patches into a plurality of un-merged patches. The plurality of un-merged patches are non-overlapping. In some examples, each un-merged patch of the plurality of un-merged patches has a uniform patch size. In some cases, the patch un-merging engine applies a patch size reduction factor of two or other value. In some aspects, to segment each patch of the one or more patches into the plurality of un-merged patches, the process 800 can include decreasing a feature dimension of the plurality of un-merged patches.

In some cases, the process 800 can include providing the plurality of un-merged patches to a first transformer block of a second decoder transformer layer of the plurality of decoder transformer layers. For instance, the patch un-merging engine 563 of the decoder transformer layer 560 can provide un-merged patches to the transformer block 574 of the decoder transformer layer 570. In some examples, the process 800 can include segmenting, by a patch un-merging engine of the second decoder transformer layer, the plurality of un-merged patches. The process 800 can further include providing an output of the patch un-merging engine to a third decoder transformer layer of the plurality of decoder transformer layers. For example, the patch un-merging engine 573 of the decoder transformer layer 570 can provide un-merged patches to the decoder transformer layer 580 (e.g., the transformer block 584 of the decoder transformer layer 580). In another example, the linear embeddings engine 591 of the decoder transformer layer 590 can apply a linear transform to the features output from the transformer block 594 and can output the linear-transformed features to the patch partitioning engine 510*b*.

In some aspects, the process 800 can include receiving, by the plurality of decoder transformer layers, the latent representation of the frame of encoded image data as input. The process 800 can include applying a non-linear transform to generate a frame of decoded image data. In some cases, the non-linear transform is a synthesis transform and the frame of decoded image data is a reconstruction of an input image associated with the frame of encoded image data.

In some examples, the process 800 can include training one or more decoder transformer layers of the plurality of decoder transformer layers using a loss function based at least in part on rate-distortion. In some cases, the loss function includes a Lagrangian multiplier for rate distortion. For instance, as described herein, a rate-distortion loss function can include $L=D+\beta*R$, with D representing distortion, R representing rate, and different $\beta$ values representing models trained for different bitrates and/or peak-signal-to-noise ratios (PSNR).

In some examples, the process 800 can include training the plurality of decoder transformer layers with at least a first training data set and a second training data set (e.g., using unsupervised training or learning). In such examples, the data of the second training data set has a reversed temporal order as compared to data of the first training data set. In some cases, all LayerNorm layers within the transformer blocks can be removed. In some examples, the window size used in the transformer blocks can be reduced from 8 to 4. Using a reversed temporal order for the data of the second training set as compared to the data of the first training set, removing the LayerNorm layers within the transformer blocks, and/or reducing the window size from 8 to 4 can lead to stable training.

Figure 9:
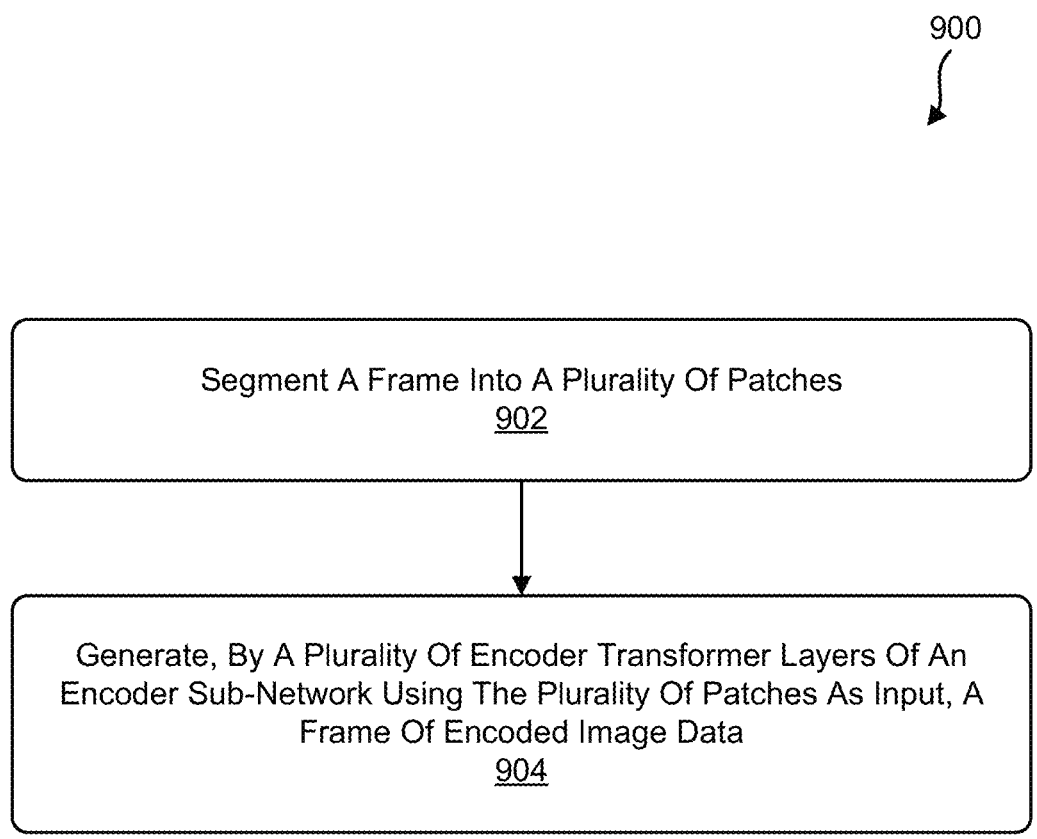
FIG. 9 is a flowchart illustrating another example of a process for processing image and/or video data, in accordance with some examples.

FIG. 9 is a flowchart illustrating an example of a process 900 for processing image and/or video data. At block 902, the process 900 includes segmenting a frame into a plurality of patches. In some examples, the frame includes a still image. In some examples, the frame includes a video frame (e.g., an unencoded video frame). In some cases, each patch of the plurality of patches is of a uniform size and includes one or more pixels of the segmented frame. For instance, the plurality of patches can be segmented from an input comprising a still image frame or a video frame.

At block 904, the process 900 includes generating, by a plurality of encoder transformer layers of an encoder sub-network using the plurality of patches as input, a frame of encoded image data. In some examples, the frame of encoded image data is a latent representation of image data. In some cases, the latent representation is a hierarchical feature map generated by the plurality of encoder transformer layers of the encoder sub-network. In some examples, the process 900 can include generating, by the plurality of encoder transformer layers of the encoder sub-network using the plurality of patches as input, a hierarchical feature map for the segmented frame. The process 900 can include generating the frame of encoded image data from the hierarchical feature map.

In one illustrative example, to generate the frame of encoded image data, the process 900 can include determining, by a first transformer block of a first encoder transformer layer of the plurality of encoder transformer layers, self-attention locally within one or more window partitions. The process 900 can include determining, by a second transformer block of the first encoder transformer layer, self-attention locally within one or more shifted window partitions. In some aspects, the first transformer block and the second transformer block have a same architecture. The one or more shifted window partitions overlap the one or more window partitions. The process 900 can further include determining, by one or more of the first transformer block and the second transformer block, one or more patches of features for applying a non-linear transform to the segmented frame. The process 900 can include increasing, by a patch merging engine, a patch size between the first encoder transformer layer and a second encoder transformer layer. As described herein, the patch merging engine is configured to combine a plurality of adjacent patches from the first encoder transformer layer into a merged patched provided to the second encoder transformer layer. In some cases, an output of the second transformer block of the first encoder transformer layer is coupled to an input of the second encoder transformer layer.

In some cases, the process 900 can include increasing, using the patch merging engine, the patch size by concatenating features obtained from one or more subsets of adjacent patches. The patch merging engine can merge each subset of adjacent patches into a merged patch output.

In some examples, the process 900 can include providing the plurality of patches to a linear embedding layer (e.g., the linear embedding layer 521 of FIG. 5A) of the encoder sub-network prior to the first encoder transformer layer. The linear embedding layer can apply a linear transform to the plurality of patches.

In some aspects, the process 900 can include training one or more encoder transformer layers of the plurality of encoder transformer layers using a loss function based on a rate-distortion loss. In some cases, the loss function includes a Lagrangian multiplier for rate distortion. As noted above, the rate-distortion loss can be represented as $L=D+\beta*R$.

In some aspects, the process 900 can include entropy coding the encoded image data with a factorized prior.

In some examples, the processes described herein (e.g., process 800, process 900, and/or any other process described herein) may be performed by a computing device, apparatus, or system. In one example, the process 800 and/or the process 900 can be performed by a computing device or system having the computing device architecture 1000 of FIG. 10. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 800 and/or the process 900, and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 and the process 900 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800, the process 900, and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
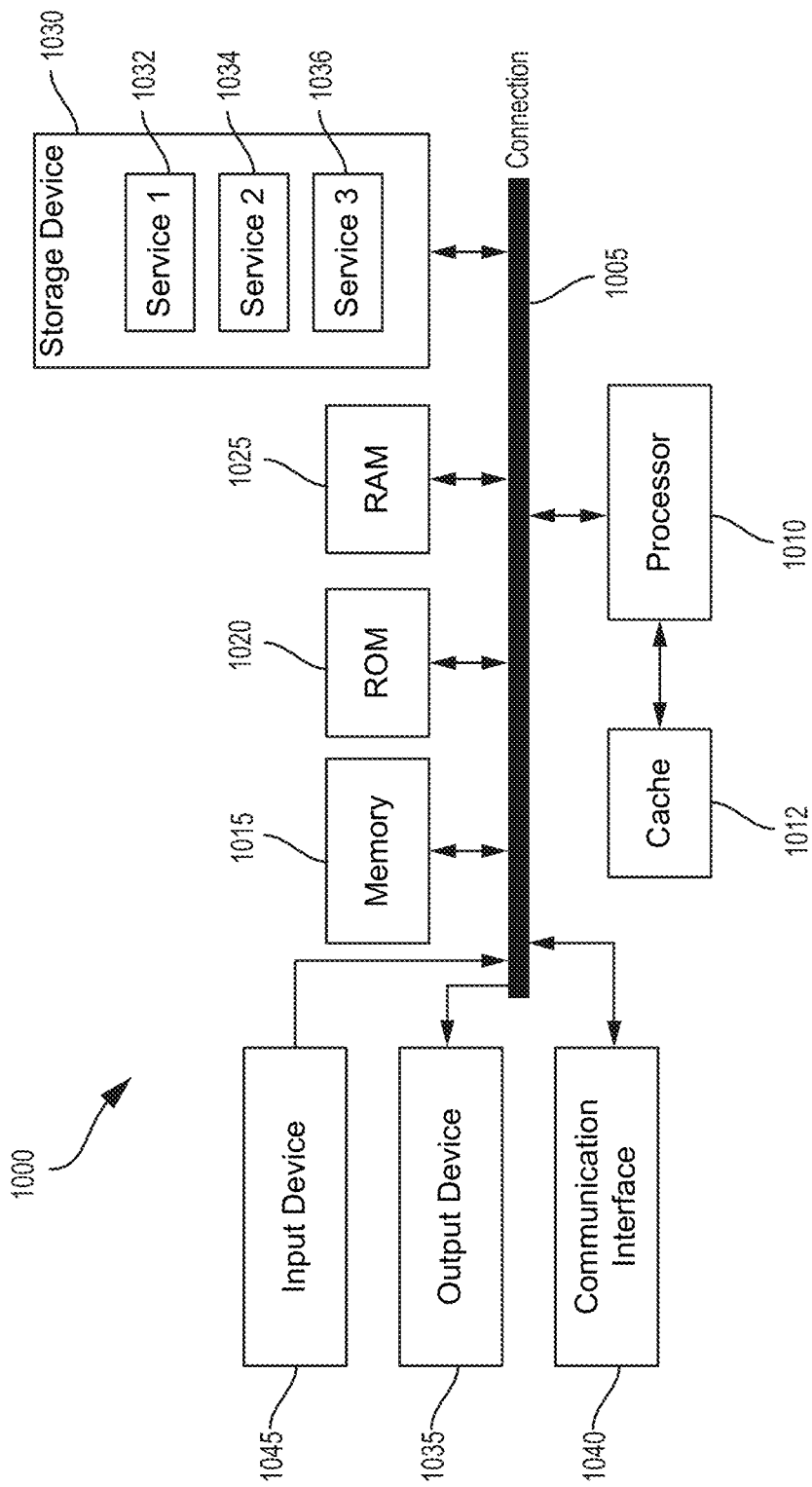
FIG. 10 illustrates an example computing device architecture of an example computing device which can implement the various techniques described herein.

FIG. 10 illustrates an example computing device architecture 1000 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 1000 can implement the system of FIG. 6A. The components of computing device architecture 1000 are shown in electrical communication with each other using connection 1005, such as a bus. The example computing device architecture 1000 includes a processing unit (CPU or processor) 1010 and computing device connection 1005 that couples various computing device components including computing device memory 1015, such as read only memory (ROM) 1020 and random-access memory (RAM) 1025, to processor 1010.

Computing device architecture 1000 can include a cache of high-speed memory connected directly with, in close proximity to, or integrated as part of processor 1010. Computing device architecture 1000 can copy data from memory 1015 and/or the storage device 1030 to cache 1012 for quick access by processor 1010. In this way, the cache can provide a performance boost that avoids processor 1010 delays while waiting for data. These and other engines can control or be configured to control processor 1010 to perform various actions. Other computing device memory 1015 may be available for use as well. Memory 1015 can include multiple different types of memory with different performance characteristics. Processor 1010 can include any general-purpose processor and a hardware or software service, such as service 1 1032, service 2 1034, and service 3 1036 stored in storage device 1030, configured to control processor 1010 as well as a special-purpose processor where software instructions are incorporated into the processor design. Processor 1010 may be a self-contained system, containing multiple cores or processors, a bus, memory controller, cache, etc. A multi-core processor may be symmetric or asymmetric.

To enable user interaction with the computing device architecture 1000, input device 1045 can represent any number of input mechanisms, such as a microphone for speech, a touch-sensitive screen for gesture or graphical input, keyboard, mouse, motion input, speech and so forth. Output device 1035 can also be one or more of a number of output mechanisms known to those of skill in the art, such as a display, projector, television, speaker device, etc. In some instances, multimodal computing devices can enable a user to provide multiple types of input to communicate with computing device architecture 1000. Communication interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. Storage device 1030 can include services 1032, 1034, 1036 for controlling processor 1010. Other hardware or software modules or engines are contemplated. Storage device 1030 can be connected to the computing device connection 1005. In one aspect, a hardware module that performs a particular function can include the software component stored in a computer-readable medium in connection with the necessary hardware components, such as processor 1010, connection 1005, output device 1035, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: An apparatus for processing media data, comprising: at least one memory; and at least one processor coupled to the at least one memory, the at least one processor configured to: obtain a latent representation of a frame of encoded image data; and generate, based on a plurality of decoder transformer layers of a decoder sub-network using the latent representation of the frame of encoded image data as input, a frame of decoded image data; wherein at least one decoder transformer layer of the plurality of decoder transformer layers includes: one or more transformer blocks configured to generate one or more patches of features and determine self-attention locally within one or more window partitions and shifted window partitions applied over the one or more patches; and a patch un-merging engine configured to decrease a respective size of each patch of the one or more patches.

Aspect 2: The apparatus of Aspect 1, wherein, to generate the frame of decoded image data, the at least one processor is configured to: determine, using a first transformer block of a first decoder transformer layer of the plurality of decoder transformer layers, self-attention locally within one or more first window partitions applied over the one or more patches; determine, using a second transformer block of the first decoder transformer layer, self-attention locally within one or more second window partitions applied over the one or more patches, wherein the one or more second window partitions are shifted to overlap one or more boundaries between adjacent ones of the one or more first window partitions; and segment, using the patch un-merging engine, each patch of the one or more patches into a plurality of un-merged patches, wherein the plurality of un-merged patches are non-overlapping.

Aspect 3: The apparatus of Aspect 2, wherein the at least one processor is configured to provide the plurality of un-merged patches to a first transformer block of a second decoder transformer layer of the plurality of decoder transformer layers.

Aspect 4: The apparatus of Aspect 3, wherein the at least on processor is configured to: segment, using a patch un-merging engine of the second decoder transformer layer, the plurality of un-merged patches; and provide an output of the patch un-merging engine to a third decoder transformer layer of the plurality of decoder transformer layers.

Aspect 5: The apparatus of any of Aspects 2 to 4, wherein each un-merged patch of the plurality of un-merged patches has a uniform patch size and the patch un-merging engine applies a patch size reduction factor of two.

Aspect 6: The apparatus of any of Aspects 2 to 5, wherein, to segment each patch of the one or more patches into the plurality of un-merged patches, the at least one processor is configured to decrease a feature dimension of the plurality of un-merged patches.

Aspect 7: The apparatus of any of Aspects 1 to 6, wherein the plurality of decoder transformer layers are configured to receive the latent representation of the frame of encoded image data as input and apply a non-linear transform to generate a frame of decoded image data.

Aspect 8: The apparatus of Aspect 7, wherein the non-linear transform is a synthesis transform and the frame of decoded image data is a reconstruction of an input image associated with the frame of encoded image data.

Aspect 9: The apparatus of any of Aspects 1 to 8, wherein the at least one processor is configured to train one or more decoder transformer layers of the plurality of decoder transformer layers using a loss function based at least in part on rate-distortion.

Aspect 10: The apparatus of Aspect 9, wherein the loss function includes a Lagrangian multiplier for rate distortion.

Aspect 11: The apparatus of any of Aspects 1 to 10, wherein at least a portion of the one or more transformer blocks included in the at least one decoder transformer layer have a same architecture.

Aspect 12: The apparatus of any of Aspects 1 to 11, wherein each of the one or more transformer blocks included in the at least one decoder transformer layer have a same architecture.

Aspect 13: The apparatus of any of Aspects 1 to 12, wherein the frame of encoded image data includes an encoded still image.

Aspect 14: The apparatus of any of Aspects 1 to 13, wherein the frame of encoded image data includes an encoded video frame.

Aspect 15: The apparatus of any of Aspects 1 to 14, wherein the at least one processor is configured to train the plurality of decoder transformer layers with at least a first training data set and a second training data set, wherein data of the second training data set has a reversed temporal order as compared to data of the first training data set.

Aspect 16: The apparatus of any of Aspects 1 to 15, wherein the plurality of decoder transformer layers include a series of consecutive decoder transformer layers.

Aspect 17: An apparatus for processing media data, comprising: at least one memory; and at least one processor coupled to the at least one memory, the at least one processor configured to: segment a frame into a plurality of patches; and generate, based on a plurality of encoder transformer layers of an encoder sub-network using the plurality of patches as input, a frame of encoded image data.

Aspect 18: The apparatus of Aspect 17, wherein, to generate the frame of encoded image data, the at least one processor is configured to: determine, using a first transformer block of a first encoder transformer layer of the plurality of encoder transformer layers, self-attention locally within one or more window partitions; determine, using a second transformer block of the first encoder transformer layer, self-attention locally within one or more shifted window partitions, wherein the one or more shifted window partitions overlap the one or more window partitions; determine, using one or more of the first transformer block and the second transformer block, one or more patches of features for applying a non-linear transform to the segmented frame; and increase, using a patch merging engine, a patch size between the first encoder transformer layer and a second encoder transformer layer.

Aspect 19: The apparatus of Aspect 18, wherein the patch merging engine is configured to combine a plurality of adjacent patches from the first encoder transformer layer into a merged patched provided to the second encoder transformer layer.

Aspect 20: The apparatus of any of Aspects 18 or 19, wherein an output of the second transformer block of the first encoder transformer layer is coupled to an input of the second encoder transformer layer.

Aspect 21: The apparatus of any of Aspects 18 to 20, wherein the at least one processor is configured to: generate, using the plurality of encoder transformer layers of the encoder sub-network using the plurality of patches as input, a hierarchical feature map for the segmented frame; and generate the frame of encoded image data from the hierarchical feature map.

Aspect 22: The apparatus of any of Aspects 18 to 21, wherein each patch of the plurality of patches is of a uniform size and includes one or more pixels of the segmented frame.

Aspect 23: The apparatus of any of Aspects 18 to 22, wherein the patch merging engine is configured to increase the patch size by concatenating features obtained from one or more subsets of adjacent patches, each subset of adjacent patches merged into a merged patch output by the patch merging engine.

Aspect 24: The apparatus of any of Aspects 18 to 23, wherein the first transformer block and the second transformer block have a same architecture.

Aspect 25: The apparatus of any of Aspects 1 to 24, wherein the at least one processor is configured to provide the plurality of patches to a linear embedding layer of the encoder sub-network prior to the first encoder transformer layer.

Aspect 26: The apparatus of any of Aspects 17 to 25, wherein the frame of encoded image data is a latent representation of image data.

Aspect 27: The apparatus of Aspect 26, wherein the latent representation is a hierarchical feature map generated by the plurality of encoder transformer layers of the encoder sub-network.

Aspect 28: The apparatus of any of Aspects 17 to 27, wherein the at least one processor is configured to train one or more encoder transformer layers of the plurality of encoder transformer layers using a loss function based on a rate-distortion loss.

Aspect 29: The apparatus of Aspect 28, wherein the loss function includes a Lagrangian multiplier for rate distortion.

Aspect 30: The apparatus of any of Aspects 17 to 29, wherein the plurality of patches are segmented from an input comprising a still image frame or a video frame.

Aspect 31: The apparatus of any of Aspects 17 to 30, wherein the at least one processor is configured to entropy code the encoded image data with a factorized prior.

Aspect 32: A method of processing media data, the method comprising: obtaining a latent representation of a frame of encoded image data; and generating, by a plurality of decoder transformer layers of a decoder sub-network using the latent representation of the frame of encoded image data as input, a frame of decoded image data, wherein at least one decoder transformer layer of the plurality of decoder transformer layers includes: one or more transformer blocks for generating one or more patches of features and determine self-attention locally within one of more window partitions and shifted window partitions applied over the one or more patches; and a patch un-merging engine for decreasing a respective size of each patch of the one or more patches.

Aspect 33: The method of Aspect 32, wherein generating, by the plurality of decoder transformer layers, the frame of decoded image data includes: determining, by a first transformer block of a first decoder transformer layer of the plurality of decoder transformer layers, self-attention locally within one or more first window partitions applied over the one or more patches; determining, by a second transformer block of the first decoder transformer layer, self-attention locally within one or more second window partitions applied over the one or more patches, wherein the one or more second window partitions are shifted to overlap one or more boundaries between adjacent ones of the one or more first window partitions; and segmenting, by the patch un-merging engine, each patch of the one or more patches into a plurality of un-merged patches, wherein the plurality of un-merged patches are non-overlapping.

Aspect 34: The method of Aspect 33, further comprising providing the plurality of un-merged patches to a first transformer block of a second decoder transformer layer of the plurality of decoder transformer layers.

Aspect 35: The method of Aspect 34, further comprising: segmenting, by a patch un-merging engine of the second decoder transformer layer, the plurality of un-merged patches; and providing an output of the patch un-merging engine to a third decoder transformer layer of the plurality of decoder transformer layers.

Aspect 36: The method of any of Aspects 33 to 35, wherein each un-merged patch of the plurality of un-merged patches has a uniform patch size and the patch un-merging engine applies a patch size reduction factor of two.

Aspect 37: The method of any of Aspects 33 to 36, wherein segmenting each patch of the one or more patches into the plurality of un-merged patches further includes decreasing a feature dimension of the plurality of un-merged patches.

Aspect 38: The method of any of Aspects 32 to 37, further comprising receiving, by the plurality of decoder transformer layers, the latent representation of the frame of encoded image data as input and apply a non-linear transform to generate a frame of decoded image data.

Aspect 39: The method of Aspect 38, wherein the non-linear transform is a synthesis transform and the frame of decoded image data is a reconstruction of an input image associated with the frame of encoded image data.

Aspect 40: The method of any of Aspects 32 to 39, further comprising training one or more decoder transformer layers of the plurality of decoder transformer layers using a loss function based at least in part on rate-distortion.

Aspect 41: The method of Aspect 40, wherein the loss function includes a Lagrangian multiplier for rate distortion.

Aspect 42: The method of any of Aspects 32 to 41, wherein at least a portion of the one or more transformer blocks included in the at least one decoder transformer layer have a same architecture.

Aspect 43: The method of any of Aspects 32 to 42, wherein each of the one or more transformer blocks included in the at least one decoder transformer layer have a same architecture.

Aspect 44: The method of any of Aspects 32 to 43, wherein the frame of encoded image data includes an encoded still image.

Aspect 45: The method of any of Aspects 32 to 44, wherein the frame of encoded image data includes an encoded video frame.

Aspect 46: The method of any of Aspects 32 to 45, further comprising training the plurality of decoder transformer layers with at least a first training data set and a second training data set, wherein data of the second training data set has a reversed temporal order as compared to data of the first training data set.

Aspect 47: The method of any of Aspects 32 to 46, wherein the plurality of decoder transformer layers include a series of consecutive decoder transformer layers.

Aspect 48: A method of processing media data, the method comprising: segmenting a frame into a plurality of patches; and generating, by a plurality of encoder transformer layers of an encoder sub-network using the plurality of patches as input, a frame of encoded image data.

Aspect 49: The method of Aspect 48, wherein generating the frame of encoded image data includes: determining, by a first transformer block of a first encoder transformer layer of the plurality of encoder transformer layers, self-attention locally within one or more window partitions; determining, by a second transformer block of the first encoder transformer layer, self-attention locally within one or more shifted window partitions, wherein the one or more shifted window partitions overlap the one or more window partitions; determining, by one or more of the first transformer block and the second transformer block, one or more patches of features for applying a non-linear transform to the segmented frame; and; and increasing, by a patch merging engine, a patch size between the first encoder transformer layer and a second encoder transformer layer.

Aspect 50: A non-transitory computer-readable storage medium having stored thereon instructions which, when executed by one or more processors, cause the one or more processors to perform any of the operations of Aspects 1 to 16 and Aspects 32 to 47.

Aspect 51: An apparatus comprising means for performing any of the operations of Aspects 1 to 16 and Aspects 32 to 47.

Aspect 52: A method of performing any of the operations of Aspects 17 to 31.

Aspect 53: A non-transitory computer-readable storage medium having stored thereon instructions which, when executed by one or more processors, cause the one or more processors to perform any of the operations of Aspects 17 to 31.

Aspect 54: An apparatus comprising means for performing any of the operations of Aspects 17 to 31.

What is claimed is:

1. An apparatus for processing media data, comprising:
at least one memory; and
at least one processor coupled to the at least one memory, the at least one processor configured to:
obtain a latent representation of a frame of encoded image data; and
generate, based on a plurality of decoder transformer layers of a decoder sub-network using the latent representation of the frame of encoded image data as input, a frame of decoded image data, wherein at least one decoder transformer layer of the plurality of decoder transformer layers includes:
one or more transformer blocks configured to generate one or more patches of features and determine self-attention locally within one or more window partitions and shifted window partitions applied over the one or more patches; and
a patch un-merging engine configured to decrease a respective size of each patch of the one or more patches,
wherein, to generate the frame of decoded image data, the at least one processor is configured to:

apply a first transformer, using a first transformer block of a first decoder transformer layer of the plurality of decoder transformer layers, to determine self-attention locally within one or more first window partitions applied over the one or more patches;

apply a second transformer, using a second transformer block of the first decoder transformer layer, to determine self-attention locally within one or more second window partitions applied over the one or more patches, wherein the one or more second window partitions are shifted to overlap one or more boundaries between adjacent ones of the one or more first window partitions; and segment, using the patch un-merging engine, each patch of the one or more patches into a plurality of un-merged patches, wherein the plurality of un-merged patches are non-overlapping; and apply a non-linear transform to data comprising the one or more patches of features to generate a frame of decoded image data that is a reconstruction of the frame of encoded image data, wherein the non-linear transform comprises a synthesis transform.

2. The apparatus of claim 1, wherein the at least one processor is configured to provide the plurality of un-merged patches to a first transformer block of a second decoder transformer layer of the plurality of decoder transformer layers.

3. The apparatus of claim 2, wherein the at least one processor is configured to:
segment, using a patch un-merging engine of the second decoder transformer layer, the plurality of un-merged patches; and
provide an output of the patch un-merging engine to a third decoder transformer layer of the plurality of decoder transformer layers.

4. The apparatus of claim 1, wherein each un-merged patch of the plurality of un-merged patches has a uniform patch size and the patch un-merging engine applies a patch size reduction factor of two.

5. The apparatus of claim 1, wherein, to segment each patch of the one or more patches into the plurality of un-merged patches, the at least one processor is configured to decrease a feature dimension of the plurality of un-merged patches.

6. The apparatus of claim 1, wherein the at least one processor is configured to train one or more decoder transformer layers of the plurality of decoder transformer layers using a loss function based at least in part on rate-distortion.

7. The apparatus of claim 6, wherein the loss function includes a Lagrangian multiplier for rate distortion.

8. The apparatus of claim 1, wherein at least a portion of the one or more transformer blocks included in the at least one decoder transformer layer have a same architecture.

9. The apparatus of claim 1, wherein each of the one or more transformer blocks included in the at least one decoder transformer layer have a same architecture.

10. The apparatus of claim 1, wherein the frame of encoded image data includes an encoded still image.

11. The apparatus of claim 1, wherein the frame of encoded image data includes an encoded video frame.

12. The apparatus of claim 1, wherein the at least one processor is configured to train the plurality of decoder transformer layers with at least a first training data set and a second training data set, wherein data of the second training data set has a reversed temporal order as compared to data of the first training data set.

13. The apparatus of claim 1, wherein the plurality of decoder transformer layers include a series of consecutive decoder transformer layers.

14. An apparatus for processing media data, comprising:
at least one memory; and
at least one processor coupled to the at least one memory, the at least one processor configured to:
segment a frame into a plurality of patches; and
encode, based on a plurality of encoder transformer layers of an encoder sub-network using the plurality of patches as input, a frame to generate encoded image data, wherein, to encode the frame, the at least one processor is configured to:
apply a first transformer, using a first transformer block of a first decoder transformer layer of the plurality of decoder transformer layers, to determine self-attention locally within one or more first window partitions applied over the one or more patches;
apply a second transformer, using a second transformer block of the first encoder transformer layer, to determine self-attention locally within one or more shifted window partitions, wherein the one or more shifted window partitions overlap the one or more window partitions;
determine, using one or more of the first transformer block and the second transformer block, one or more patches of features for applying a non-linear transform to the segmented frame;
increase, using a patch merging engine, a patch size between the first encoder transformer layer and a second encoder transformer layer; and
apply a non-linear transform to data comprising the one or more patches of features to compress the frame of encoded image data wherein the non-linear transform comprises a synthesis transform.

15. The apparatus of claim 14, wherein the patch merging engine is configured to combine a plurality of adjacent patches from the first encoder transformer layer into a merged patched provided to the second encoder transformer layer.

16. The apparatus of claim 14, wherein an output of the second transformer block of the first encoder transformer layer is coupled to an input of the second encoder transformer layer.

17. The apparatus of claim 14, wherein the at least one processor is configured to:
generate, using the plurality of encoder transformer layers of the encoder sub-network using the plurality of patches as input, a hierarchical feature map for the segmented frame; and
generate the frame of encoded image data from the hierarchical feature map.

18. The apparatus of claim 14, wherein each patch of the plurality of patches is of a uniform size and includes one or more pixels of the segmented frame.

19. The apparatus of claim 14, wherein the patch merging engine is configured to increase the patch size by concatenating features obtained from one or more subsets of adjacent patches, each subset of adjacent patches merged into a merged patch output by the patch merging engine.

20. The apparatus of claim 14, wherein the first transformer block and the second transformer block have a same architecture.

21. The apparatus of claim 14, wherein the at least one processor is configured to provide the plurality of patches to a linear embedding layer of the encoder sub-network prior to the first encoder transformer layer.

22. The apparatus of claim 14, wherein the frame of encoded image data is a latent representation of image data.

23. The apparatus of claim 22, wherein the latent representation is a hierarchical feature map generated by the plurality of encoder transformer layers of the encoder sub-network.

24. The apparatus of claim 14, wherein the at least one processor is configured to train one or more encoder transformer layers of the plurality of encoder transformer layers using a loss function based on a rate-distortion loss.

25. The apparatus of claim 24, wherein the loss function includes a Lagrangian multiplier for rate distortion.

26. The apparatus of claim 14, wherein the plurality of patches are segmented from an input comprising a still image frame or a video frame.

27. The apparatus of claim 14, wherein the at least one processor is configured to entropy code the encoded image data with a factorized prior.

28. A method of processing media data, the method comprising:
obtaining a latent representation of a frame of encoded image data; and
generating, by a plurality of decoder transformer layers of a decoder sub-network using the latent representation of the frame of encoded image data as input, a frame of decoded image data, wherein at least one decoder transformer layer of the plurality of decoder transformer layers includes:
one or more transformer blocks for generating one or more patches of features and determine self-attention locally within one or more window partitions and shifted window partitions applied over the one or more patches; and
a patch un-merging engine for decreasing a respective size of each patch of the one or more patches, wherein generating, by the plurality of decoder transformer layers, the frame of decoded image data includes:
applying a first transformer, by a first transformer block of a first decoder transformer layer of the plurality of decoder transformer layers, to determine self-attention locally within one or more first window partitions applied over the one or more patches;
applying a first transformer, by a second transformer block of the first decoder transformer layer, to determine self-attention locally within one or more second window partitions applied over the one or more patches, wherein the one or more second window partitions are shifted to overlap one or more boundaries between adjacent ones of the one or more first window partitions;
segmenting, by the patch un-merging engine, each patch of the one or more patches into a plurality of un-merged patches, wherein the plurality of un-merged patches are non-overlapping; and
applying a non-linear transform to data comprising the one or more patches of features to generate a frame of decoded image data that is a reconstruction of the frame of encoded image data, wherein applying the non-linear transform comprises applying a synthesis transform and wherein the reconstruction of the frame of encoded image data comprises a reconstruction of an input image associated with the frame of encoded image data.

29. The method of claim 28, further comprising providing the plurality of un-merged patches to a first transformer block of a second decoder transformer layer of the plurality of decoder transformer layers.

30. The method of claim 29, further comprising:
segmenting, by a patch un-merging engine of the second decoder transformer layer, the plurality of un-merged patches; and
providing an output of the patch un-merging engine to a third decoder transformer layer of the plurality of decoder transformer layers.

31. The method of claim 28, wherein each un-merged patch of the plurality of un-merged patches has a uniform patch size and the patch un-merging engine applies a patch size reduction factor of two.

32. The method of claim 28, wherein segmenting each patch of the one or more patches into the plurality of un-merged patches further includes decreasing a feature dimension of the plurality of un-merged patches.

33. The method of claim 28, further comprising training one or more decoder transformer layers of the plurality of decoder transformer layers using a loss function based at least in part on rate-distortion.

34. The method of claim 33, wherein the loss function includes a Lagrangian multiplier for rate distortion.

35. The method of claim 28, wherein at least a portion of the one or more transformer blocks included in the at least one decoder transformer layer have a same architecture.

36. The method of claim 28, wherein each of the one or more transformer blocks included in the at least one decoder transformer layer have a same architecture.

37. The method of claim 28, wherein the frame of encoded image data includes an encoded still image.

38. The method of claim 28, wherein the frame of encoded image data includes an encoded video frame.

39. The method of claim 28, further comprising training the plurality of decoder transformer layers with at least a first training data set and a second training data set, wherein data of the second training data set has a reversed temporal order as compared to data of the first training data set.

40. The method of claim 28, wherein the plurality of decoder transformer layers include a series of consecutive decoder transformer layers.

41. A method of processing media data, the method comprising:
segmenting a frame into a plurality of patches; and
encoding, by a plurality of encoder transformer layers of an encoder sub-network using the plurality of patches as input, a frame of to generate encoded image data, wherein encoding the frame comprises:
applying a first transformer, by a first transformer block of a first encoder transformer layer of the plurality of encoder transformer layers, to determine self-attention locally within one or more window partitions;
applying a second transformer, by a second transformer block of the first encoder transformer layer, to determine self-attention locally within one or more shifted window partitions, wherein the one or more shifted window partitions overlap the one or more window partitions;
determining, by one or more of the first transformer block and the second transformer block, one or more patches of features for applying a non-linear transform to the segmented frame;
increasing, by a patch merging engine, a patch size between the first encoder transformer layer and a second encoder transformer layer; and
applying a non-linear transform to data comprising the one or more patches of features to generate the frame of encoded image data, wherein applying the non-linear transform comprises applying a synthesis transform.

\* \* \* \* \*